(12) United States Patent
Sun et al.

(10) Patent No.: US 10,621,729 B2
(45) Date of Patent: Apr. 14, 2020

(54) ADAPTIVE FOCUS SWEEP TECHNIQUES FOR FOREGROUND/BACKGROUND SEPARATION

(71) Applicant: Apple Inc., Cupertino, CA (US)

(72) Inventors: Wei Sun, San Jose, CA (US); Jun Hu, Sunnyvale, CA (US); Tongbo Chen, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 121 days.

(21) Appl. No.: 15/620,131

(22) Filed: Jun. 12, 2017

(65) Prior Publication Data

US 2017/0358094 A1 Dec. 14, 2017

Related U.S. Application Data

(60) Provisional application No. 62/348,993, filed on Jun. 12, 2016.

(51) Int. Cl.
| | | |
|---|---|---|
| G06K 9/00 | (2006.01) |
| G06T 7/194 | (2017.01) |
| G06T 7/174 | (2017.01) |
| G06T 7/11 | (2017.01) |

(52) U.S. Cl.
CPC .............. *G06T 7/194* (2017.01); *G06T 7/11* (2017.01); *G06T 7/174* (2017.01); *G06T 2207/10148* (2013.01); *G06T 2207/20028* (2013.01)

(58) Field of Classification Search
CPC combination set(s) only.
See application file for complete search history.

(56) References Cited

U.S. PATENT DOCUMENTS

| | | | |
|---|---|---|---|
| 8,194,995 B2 | 6/2012 | Wong | |
| 8,508,652 B2 | 8/2013 | Albu | |
| 8,593,542 B2 | 11/2013 | Steinberg | |
| 2001/0022860 A1 | 9/2001 | Kitamura | |
| 2008/0123960 A1* | 5/2008 | Kim | G06K 9/38 |
| | | | 382/173 |

(Continued)

OTHER PUBLICATIONS

Levin, et al., "A Closed Form Solution to Natural Image Matting," School of Computer Science and Engineering, The Hebrew University of Jerusalem, 2008.

(Continued)

*Primary Examiner* — Alex Kok S Liew
(74) *Attorney, Agent, or Firm* — Blank Rome LLP

(57) ABSTRACT

Adaptive focus sweep (AFS) techniques for image processing are described. For one technique, an AFS logic/module can obtain an AFS representing a scene, where the AFS is a sequence of images representing the scene that includes: (i) a first image representing the scene captured at a first focus position; and (ii) a second image representing the scene captured at a second focus position that differs from the first focus position. The first focus position can be associated with a first depth of field (DOField) that is determined based on an autofocus technique. The second focus position can be associated with a second DOField, where the second focus position is at least two DOFields away from the first focus position. The AFS logic/module can detect a foreground of the scene in the first image based on information acquired from the first and second images. Other embodiments are described.

44 Claims, 15 Drawing Sheets

(56) References Cited

U.S. PATENT DOCUMENTS

| | | | |
|---|---|---|---|
| 2009/0067828 A1* | 3/2009 | Ono | G02B 7/102 396/128 |
| 2010/0033617 A1* | 2/2010 | Forutanpour | G06T 7/564 348/345 |
| 2015/0055824 A1 | 2/2015 | Hong | |
| 2015/0086127 A1 | 3/2015 | Camilus | |

OTHER PUBLICATIONS

Mir, et al., "An extensive empirical evaluation of focus measures for digital photography," Cheriton School of Computer Science, University of Waterloo, Canada, 2014.

Vercauteren, et al., "Diffeomorphic Demons: Efficient Non-parametric Image Registration," Oct. 22, 2008.

\* cited by examiner

ADAPTIVE FOCUS SWEEP TECHNIQUES FOR FOREGROUND/BACKGROUND SEPARATION

CROSS-REFERENCE TO RELATED APPLICATIONS

This application claims priority to U.S. Provisional Application No. 62/348,993, entitled "ADAPTIVE FOCUS SWEEP TECHNIQUES FOR FOREGROUND/BACKGROUND SEPARATION," filed Jun. 12, 2016. U.S. Provisional Application No. 62/348,993 is hereby incorporated by reference in its entirety.

FIELD

Embodiments described herein relate to digital image processing. More particularly, the embodiments described herein relate to techniques of distinguishing an image's foreground from its background.

BACKGROUND INFORMATION

A large imaging device, like a digital single-lens reflex (DSLR) camera, can generate an image that exhibits a focused foreground and a blurred background. This is because such devices have large apertures, which enable control over the depth of field (DOField) in an image. For example, a shallow depth of field (sDOField) effect can often be used by a DSLR camera to generate an image that includes a sharply focused foreground object (e.g., a person) and a blurred background object (e.g., a scenery behind the person, etc.). In contrast, smaller imaging devices (e.g., a mobile device camera, a table computer camera, a webcam, etc.) have smaller apertures and shorter focal lengths than large imaging devices, and as a result, are unable to generate images that exhibit a focused foreground and a blurred background without additional processing. This is because the smaller apertures and shorter focal lengths in these smaller imaging devices fail to provide the same level of control over DOField as the control found in larger imaging devices. Typically, additional processing is performed on images captured by smaller imaging devices to replicate the effects provided by larger imaging devices (e.g., the sDOField effect, etc.).

Replicating the effects provided by larger imaging devices on images captured by smaller imaging devices typically requires distinguishing one or more foreground objects in a digital image representing a scene (e.g., a person, etc.) from the background in the digital image representing the scene (e.g., a scenery behind the person, etc.). This separation enables one or more processing operations to be applied to the foreground and the background separately to achieve a desired visual effect in an image (e.g., to achieve an sDOField effect, etc.).

One conventional approach to synthesizing effects (e.g., an sDOField effect) on a digital image captured by a smaller imaging device is as follows: (i) generate a conventional depth map for a digital image representing a scene; and (ii) artificially add extra blur to the background in the digital image representing the scene based on the depth map. Generating depth maps generally requires a focus sweep. As used herein, a "focus sweep," a "focal sweep," a "focal stack of images," and their variations refer to a group of multiple images representing a scene, each of which correspond to a different focus position. That is, each image in the group is captured at a different focus position from all other images in the group. A focus sweep is generally performed sequentially, with the images in the stack being captured over a finite time period.

A conventional focus sweep typically requires at least half a dozen images to cover a smaller imaging device's working distance. This requirement generally translates to a need for a large amount of computational resources (e.g., large memory requirement, increased processing capability, a longer capture time, etc.), which can affect the functioning of a small-format imaging device by reducing the processing power available for other tasks. In order to reduce the number of images in the focus sweep, it may be necessary to estimate the optimal focus positions for a given scene before capture. Unfortunately, this estimation can require additional images to be collected before the estimation can be performed, which may not be feasible. Moreover, due to the inaccuracies in both the estimation and the lens movement, the focus positions at which the images are actually captured may not be ideal, resulting in unintended blurring of the foreground in an image.

SUMMARY

Methods, apparatuses, and systems for adaptive focus sweep (AFS) techniques are described. Such embodiments can assist with distinguishing a digital image's foreground from its background using an AFS.

For one embodiment, an AFS logic/module can obtain an AFS representing a scene, where the AFS is a sequence of images representing the scene that includes: (i) a first image representing the scene captured at a first focus position; and (ii) a second image representing the scene captured at a second focus position that differs from the first focus position. For one embodiment, the AFS logic/module directs an imaging device (e.g., imaging sensor(s) and/or corresponding camera circuitry, etc.) to capture the AFS. The first image can be captured before or after the second image. For one embodiment, the AFS logic/module determines the first focus position using an autofocus technique, and the AFS logic/module determines the second focus position based on the first focus position. The first focus position can be associated with a first depth of field (DOField) that is determined based on the autofocus technique. The second focus position can be associated with a second DOField, where the second DOField is at least two DOFields away from the first DOField. For one embodiment, the second DOField is two DOFields away from the first DOField.

For one embodiment, the AFS logic/module uses information acquired from the first and second images to detect the scene's foreground in the first image and generate a foreground mask. For one embodiment, the scene's background in the first image can be designated as any portion of the scene in the first image that is not covered by the foreground mask. The detected foreground and/or background can be used for additional image processing and/or image generation.

For one embodiment, the AFS logic/module generates the foreground mask based on identifying one or more initial foreground pixels in the first image using an initial foreground confidence map. The initial foreground confidence map includes a collection of initial confidence values that denote levels of confidence that pixels of the first image are part of the foreground. The initial foreground confidence map can be based on a comparison between sharpness values associated with pixels of the first image and corresponding sharpness values associated with pixels of the second image.

The foreground mask can be an initial foreground mask. For one embodiment, the AFS logic/module generates the initial foreground mask based on the identification of the initial foreground pixels. For one embodiment, the AFS logic/module identifies each pixel in the first image whose initial confidence value is equal to or greater than a threshold confidence value as an initial foreground pixel to be masked by the initial foreground mask. Also, the AFS logic/module may identify each pixel in the first image whose initial confidence value is less than the threshold confidence value as an initial background pixel that will not be masked by the initial foreground mask. For a further embodiment, the AFS logic/module identifies the initial foreground pixels using the initial foreground confidence map and a depth map. For this further embodiment, the initial foreground pixels may be identified as pixels in the reference image that have depths within a range of depths associated with a determined peak depth value. When a depth map is used with an initial foreground confidence map, the identification by the AFS logic/module can be based on a depth map associated with the first image and/or the second image. For one embodiment, the AFS logic/module generates the initial foreground mask based on the initial foreground pixel(s) of the first image.

The foreground mask can be an updated foreground mask. For one embodiment, the AFS logic/module generates the updated foreground mask based on the initial foreground mask. For one embodiment, the AFS logic/module begins generating the updated foreground mask by extracting a contour band from the initial foreground mask. The contour band encompasses pixels in the first image that are located around edges of the initial foreground mask. In this way, the contour band includes the following: (i) initial foreground pixels that are masked by the initial foreground mask; and (ii) initial background pixels that are not masked by the initial foreground mask. For one embodiment, about half of the first image's pixels that are defined by the contour band are associated with the initial foreground mask (i.e., the initial foreground pixels), while the other half of the first image's pixels that are defined by the contour band are not associated with the initial foreground mask (i.e., these pixels are not the initial foreground pixels). For one embodiment, the AFS logic/module determines a foreground contour confidence value and a background contour confidence value for each pixel in the first image defined by the contour band.

The foreground contour confidence value of each pixel in the first image defined by the contour band indicates a degree of certainty that the pixel is part of the foreground. Also, the background contour confidence value of each pixel in the first image defined by the contour band indicates a degree of certainty that the pixel is part of the background. In addition, the AFS logic/module can exclude one or more initial foreground pixels that are defined by the contour band and masked by the initial foreground mask from the identified one or more pixels of the first image to be masked by the updated foreground mask. The AFS logic/module can also include one or more initial background pixels that are defined by the contour band and are not masked by the initial foreground mask in the identified one or more pixels of the first image to be masked by the updated foreground mask. For the sake of brevity, the excluded pixels defined by the contour band are referred to herein as background contour pixels and the included pixels defined by the contour band are referred to herein as foreground contour pixels.

For one embodiment, each background contour pixel (i.e., each excluded pixel defined by the contour band) has a background contour confidence value that is larger than its foreground contour confidence value by at least a first specified threshold amount. For another embodiment, each foreground contour pixel (i.e., each included pixel defined by the contour band) has a foreground contour confidence value that is larger than its background contour confidence value by at least a second specified threshold amount. For a further embodiment, each background contour pixel has a background contour confidence value that is larger than its foreground contour confidence value by at least a first specified threshold amount and a depth confidence value that is less than or equal to a specified depth confidence threshold. For another embodiment, each foreground contour pixel has a foreground contour confidence value that is larger than its background contour confidence value by at least a second specified threshold amount and a depth confidence value that is less than or equal to a specified depth confidence threshold.

For one embodiment, the AFS logic/module generates an updated foreground mask to mask the initial foreground pixels and the foreground contour pixels defined by the contour band without masking the initial background pixels and the background contour pixels defined by the contour band. That is, the updated foreground mask comprises the initial foreground mask with (i) the background contour pixels defined by the contour band removed; and (ii) the foreground contour pixels defined by the contour band added. For the sake of brevity, the pixels masked by the updated foreground mask can be collectively referred to as updated foreground pixels and the pixels that are not masked by the updated foreground mask can be collectively referred to as updated background pixels.

The AFS logic/module can also use one or more additional masks to determine that one or more pixels in the first image which lack sufficient information are part of the foreground in the first image in addition to the updated foreground pixels. As used herein, a pixel lacks sufficient information when one or more values associated with the pixel are below respective one or more threshold levels. For one embodiment, the additional masks are applied to pixel(s) in the reference image that lack sufficient information and are encompassed by the contour band. For the sake of brevity, the pixel(s) with insufficient information that are determined to be part of the foreground in the first image using the additional mask(s) can be referred to as additionally determined foreground pixels and the pixel(s) with insufficient information that are not determined as part of the foreground in the first image using the additional mask(s) can be referred to as additionally determined background pixels. The one or more additional masks can include at least one of a highlight mask, a color mismatch mask, or a focus irregularity mask. One or more noise filtering techniques can also be applied to further refine the pixels that are to be considered part of the foreground and/or background in the first image.

When the additional mask(s) are used, the AFS logic/module generates an updated foreground mask to mask the updated foreground pixel(s) in the first image and the additionally determined foreground pixel(s) in the first image without masking the updated background pixel(s) and the additionally determined background pixel(s). The AFS logic/module can also align or register the first and second images with each other to compensate for any shifting that occurs when capturing the images. The shifting can be due to displacement of an imaging device or a lens assembly capturing the images.

Other features or advantages of the embodiments described herein will be apparent from the accompanying drawings and from the detailed description that follows below.

BRIEF DESCRIPTION OF THE DRAWINGS

Embodiments described herein are illustrated by way of example and not limitation in the figures of the accompanying drawings, in which like references indicate similar features. Furthermore, in the figures some conventional details have been omitted so as not to obscure the inventive concepts described herein.

FIG. 3B provides additional details about the embodiment illustrated in FIG. 3A.

DETAILED DESCRIPTION

Figure 1A:
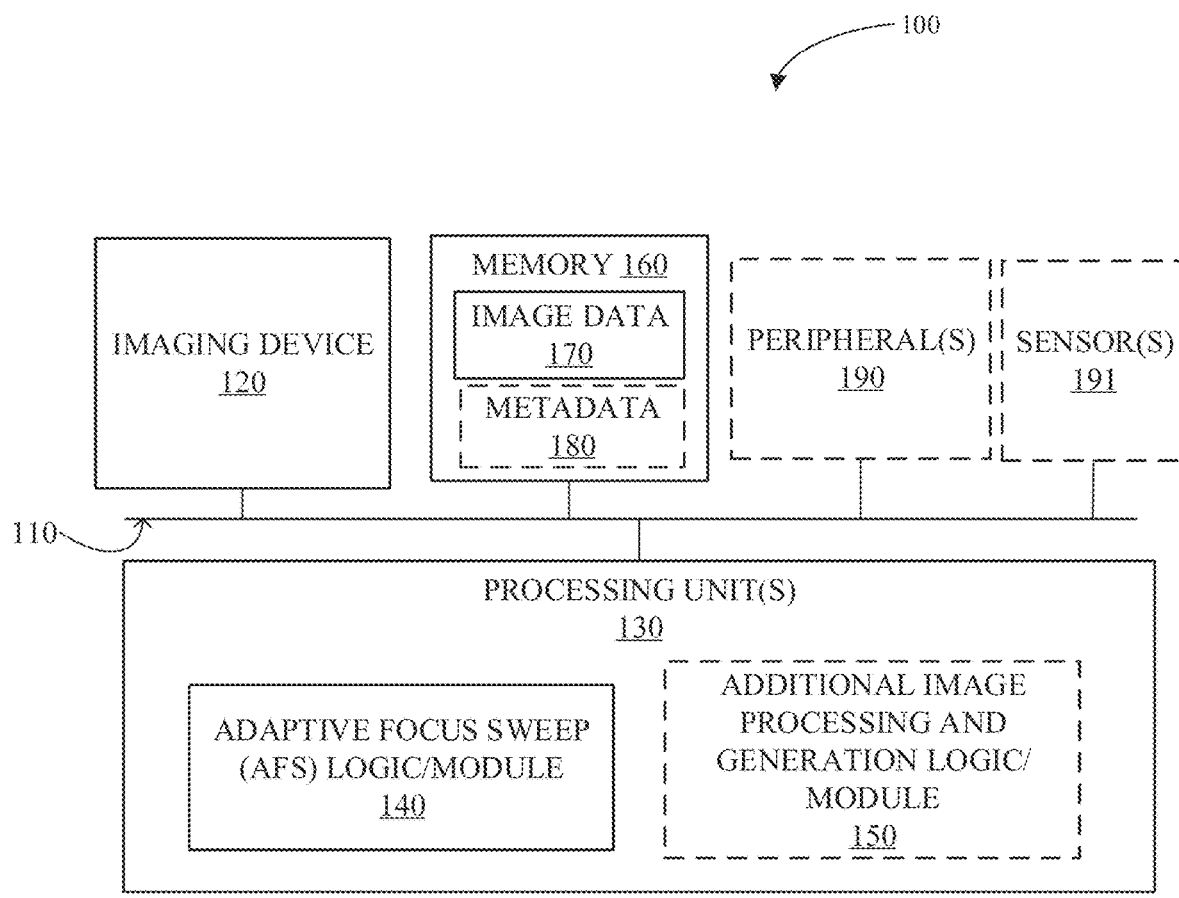
FIG. 1A illustrates, in block diagram form, a processing system that includes electronic components for performing an adaptive focus sweep (AFS) technique according to an embodiment.

Methods, apparatuses, and systems for adaptive focus sweep (AFS) techniques are described. One or more of the disclosed embodiments can assist with distinguishing a scene's foreground in an image representing the scene from the scene's background using an AFS. For one embodiment, an AFS is a sequence of images that includes: (i) a first image captured at a first focus position; and (ii) a second image captured at a second focus position that differs from the first focus position, where the second focus position is calculated from the first focus position.

Embodiments of the AFS techniques set forth herein can assist with improving the functionality of computing devices or systems that generate images having one or more effects. Computer functionality can be improved by enabling such computing devices or systems to use an AFS to synthesize effects on images, and may do so with a fewer number of captured images than is typically acquired from a conventional focus sweep for synthesizing the effects (e.g., in some instances the AFS may use just the first and the second images). Use of an AFS can assist with reducing or eliminating wasted computational resources (e.g., memory, processing power, computational time, etc.). For example, at least one embodiment of an AFS technique described herein includes capturing an AFS, which is a sequence of two images of a scene. The first image is captured at a first focus position and the second image is captured at a second focus position that is different from the first focus position. For this example, the first focus position is associated with a first depth of field (DOField) that is determined based on an autofocus technique. The second focus position is determined based on the first focus position. The second focus position has a second DOField that is at least two DOFields away from the first DOField. Furthermore, and for this example, a foreground and a background in the first image are distinguished from each other based on information acquired from the AFS. Additional image processing can be performed on the detected foreground and/or background.

As shown by the immediately preceding examples, embodiments of AFS techniques described herein can reduce or eliminate the need to use conventional approaches of synthesizing effects on an image, such as a conventional focus sweep that typically requires at least half a dozen images to cover the working distance of a small imaging device (e.g., a mobile device camera, etc.). Consequently, embodiments of the AFS techniques described herein can reduce or eliminate the need to devote computational resources to conventional approaches for synthesizing effects on images, which can include reducing or eliminating the need for a large amount of computational resources associated with a conventional focus sweep. For example, memory required for storing, processing capability for processing, and/or capture time for capturing the additional images of a conventional focus sweep (as opposed to the relatively fewer images of an AFS) can be reduced or eliminated. Computer functionality can also be improved by enabling a foreground to be distinguished from a background despite inaccuracies in lens movement that deviate from intended focus positions, which can cause unintended blurring of the foreground in an image. This is because, for one embodiment, the first image of an AFS is captured with the intended foreground in focus, while the second image is captured with the intended background more in focus than the intended foreground. Furthermore, computer functionality can be improved because the differing images may be used to generate a foreground mask, which can enable application of effects to the foreground in the first image, while avoiding areas in the first image that are not masked by the foreground mask (e.g., the background).

FIG. 1A, illustrates in block diagram form, a processing system 100 that includes electronic components for performing an adaptive focus sweep (AFS) technique according to an embodiment. The system 100 can be housed in single computing device, such as a desktop computer, a laptop computer, a tablet computer, a server, a mobile phone, a media player, a personal digital assistant (PDA), a personal communicator, a gaming device, a network router or hub, a wireless access point (AP) or repeater, a set-top box, or a combination thereof. Alternatively, the components of system 100 can be spatially separated and implemented on separate computing systems that are connected by the communication fabric 110, which is described in further detail below.

For one embodiment, the system 100 may include processing unit(s) 130, which includes at least one of an AFS logic/module 140 or an additional image processing and generation logic/module 150. The system 100 can also include a communication fabric 110, memory 160 that includes at least one of image data 170 or metadata 180, an imaging device 120, peripheral(s) 190, and/or sensor(s) 191. Each of the logic/module 150, the metadata 180, the peripheral(s) 190, and the sensor(s) 191 is illustrated with a dashed box to show that it is an optional component of the system 100. Nevertheless, one or more of the logic/module 150, the metadata 180, the peripheral(s) 190, and the sensor(s) 191 is not always an optional component of the system 100—some embodiments of the system 100 may require at least one of the logic/module 150, the metadata 180, the peripheral(s) 190, or the sensor(s) 191 (e.g., a camera, a smartphone with a camera, etc.). Each component in the system 100 is described below.

As shown in FIG. 1A, the system 100 can include processing unit(s) 130, such as CPUs, GPUs, other types of integrated circuits (ICs), corresponding memory, and/or other related circuitry. For one embodiment, the processing unit(s) 130 enables the system 100 to manipulate computer graphics and/or perform image processing. For one embodiment, the processing unit(s) 130 includes an adaptive focus sweep (AFS) logic/module 140. The AFS logic/module 140 can be implemented as at least one of hardware (e.g., electronic circuitry associated with the processing unit(s) 130, circuitry, dedicated logic, etc.), software (e.g., one or more instructions associated with a computer program executed by the processing unit(s) 130, software run on a general-purpose computer system or a dedicated machine, etc.), or a combination thereof. For one embodiment, the AFS logic/module 140 performs one or more embodiments of an AFS technique, as described herein.

For one embodiment, the AFS logic/module 140 enables the system 100 to capture an AFS. As used herein, an "adaptive focus sweep," an "AFS," and their variations refer to a sequence of images that includes: (i) a first image (also referred to as a reference image) captured at a first focus position (also referred to as a reference focus position); and (ii) a second image (also referred to as a non-reference image) captured at a second focus position (also referred to as a non-reference focus position) that is different from the first focus position (also referred to as the reference focus position). It should be appreciated that the first image may be captured before the second image, or vice versa.

As used herein, a "focus position" and its variations refer to a lens position in an imaging device as measured from the lens to the image sensor that enables capturing an image that presents a specific range of depths (a depth of field for the focal position, as will be discussed below) in a scene (which may contain a certain object, point, or area), while all other objects, points, or areas in the scene outside of the range of depths are presented as being out of focus. For example, a first focus position will enable capturing a first image that presents a person standing in front of a wall in focus with the wall being out of focus (assuming a sufficient distance between the person and the wall for a given depth of field), while a second focus position will enable capturing a second image that presents the wall as being in focus. Each focus position has a corresponding object position, each of which are respectively defined by an image distance (also referred to herein as "Z") and a corresponding object distance (also referred to herein as "O"). As used here, an image distance is the distance between the lens and the sensor, while an object distance is the distance between the lens and a given location in a scene plane. When the lens is at a given focus position (and its corresponding image position), the object position corresponding to that focus position is the object distance for which the scene plane (i.e., a plane in the real world) as measured from the lens to the specific location in the real world that would remain in focus even as a circle of confusion associated with the focus position approaches zero.

As used herein, a "depth of field," a "DOField," and their variations refer to a range of object positions, for a given in focus position, where an object, a point, or an area positioned at the object positions will appear in focus during image capture. An object will appear in focus when the corresponding portions of the captured image have sharpness that is equal to or greater than a predetermined threshold sharpness. A corollary of the DOField is the depth of focus (DOFocus), which is used herein to refer to a range of focus positions for which a given object position will appear in focus. As discussed above, because each object position has a corresponding focus position, one can consider that each focus position also has a corresponding DOFocus, where the corresponding DOFocus is the DOFocus for the object position corresponding to the focus position. For example, a reference focus position described herein is associated with a corresponding object position (referred to herein as a reference object position), a corresponding DOFocus (referred to herein as a reference DOFocus), and a corresponding DOField (referred to herein as a reference DOField). The relationship between focus position, object position, DOField and DOFocus are illustrated and described in more detail below with respect to FIGS. 3A and 3B.

For one embodiment, the AFS includes no more than two images—that is, a reference image and a non-reference image. The reference image is an image captured at a reference focus position, and the non-reference image is captured at a non-reference focus position. For one embodiment, the reference image may be made from a single exposure, or may be a combination of a plurality of exposures captured at the reference focus position. Additionally or alternatively, the non-reference image may be made from a single exposure, or may be a combination of a plurality of exposures captured at the non-reference focus position. Thus, multiple reference images captured using different exposures at the reference focus position can be subsequently combined to form a single reference image; and/or multiple non-reference images captured using different exposures at the non-reference focus position can be subsequently combined to form a single non-reference image. Additional details about a reference image, a reference focus position, a non-reference image, and a non-reference focus position are described below in connection with at least FIGS. 3A-3B. For one embodiment, the AFS logic/module 140 determines a reference focus position and a non-reference focus position in accordance with one or more descriptions provided below in connection with at least FIGS. 3A-3B.

For one embodiment, the AFS logic/module 140 can direct an imaging device 120 to capture the AFS, receive the AFS from an imaging device 120 that captures the AFS, or obtain the AFS from the memory 160 or another source (e.g., another processing unit, etc.). As used herein, an "imaging device," a "camera," a "camera device," a "camera system," an "imaging system," an "imaging capture device," an "imaging capture system," and their variations refer to one or more lens assemblies along with one or more imaging sensors and corresponding camera circuitry utilized to capture an image. For one embodiment, the imaging device 120 captures the reference image of the AFS with an intended foreground that is in focus and with an intended background that is out of focus. For another embodiment, the imaging device 120 captures the reference image of the AFS with an intended foreground that is more in focus than an intended background. For one embodiment, the imaging device 120 captures the reference image of the AFS using an autofocus technique that determines the reference focus position. As used herein, "autofocus" refers to an optical adjustment that includes automatically focusing one or more images in an image-forming optical system. For example, autofocus techniques include using an imaging device to automatically focus on an object, a point, or an area in a scene. For this example, the imaging device includes a control unit/device/system (e.g., a motor, etc.) for controlling one or more lens assemblies of the imaging device to automatically focus on a selected object, point, or area in a scene. It is to be appreciated that autofocus techniques can include some user input—for example, user input representative of a selection of an object, a point, or an area in a scene to be autofocused.

Autofocus techniques can be active autofocus techniques or passive autofocus techniques. Active autofocus techniques measure a distance to the object being captured independently of the imaging system, and subsequently adjust the imaging system for correct focus. Passive autofocus techniques determine correct focus by passively analyzing images captured by the imaging system. Passive autofocus techniques can be achieved by contrast detection or phase detection. Passive autofocus techniques performed through contrast detection generally include initially positioning the lens at a closest focus position, and incrementally shifting the lens while evaluating sharpness at each incremental shift. When a peak in sharpness is reached, the lens shifting is stopped. Contrast detection generally includes mapping evaluated pixels of an image to corresponding values that each represent a degree of focus associated with the pixels. Passive autofocus techniques performed through phase detection generally involve a secondary mirror, separator lenses, and a focus sensor. The separator lenses direct light coming from opposite sides of the lens towards the auto focus sensor. A phase difference between the two images is measured. The lens is shifted to an image distance from the image sensor that corresponds to the phase difference. When an autofocus technique is used to select a focus position for a lens as described here, it should be appreciated that any suitable autofocus technique (such as one or more of those discussed above) may be used.

For one embodiment, determining the reference focus position using an autofocus technique can enable a user of system 100 or the imaging device 120 to select the intended foreground such that the autofocus technique is applied to capture the reference image with the intended foreground in focus (or with the intended foreground more in focus than an intended background). Alternatively or additionally, determining the reference focus position using an autofocus technique can be performed without user input, via computer-provided input, and result in capturing the reference image with an intended foreground in focus (or with the intended foreground more in focus than an intended background). For one embodiment, the reference focus position is associated with a depth of field (DOField).

For one embodiment, the imaging device 120 captures a non-reference image of the AFS based on the reference image. For example, and for one embodiment, the imaging device 120 captures the non-reference image with an intended foreground that is out of focus (and with an intended background that is more in focus than the intended foreground). For this embodiment, the imaging device 120 captures the non-reference image using a non-reference focus position, which is one or more depths of field (DOFields) away from the reference focus position. Specifically, and for one embodiment, the DOField associated with the non-reference image is at least two DOFields away from the DOField associated with the reference focus position. In this way, the imaging device 120 can capture the non-reference image with an intended foreground that is out of focus (and with an intended background that is more in focus than the intended foreground). For one embodiment, the reference and non-reference images can have the same or different resolutions.

After the AFS logic/module 140 obtains or receives the AFS, the AFS logic/module 140 can align or register the reference and non-reference images with each other to compensate for any shifting between capturing the two images. The shifting can occur due to at least one of the following during capture of the AFS: (i) movement or displacement of the imaging device 120; or (ii) movement or displacement of the objects being captured. For example, and for one embodiment, a non-parametric diffeomorphic image registration algorithm based on Thirion's demons algorithm can be used to align or register the reference and non-reference images with each other to compensate for any shifting between the images. Other image alignment/registration techniques (e.g., intensity-based registration algorithms, feature-based registration algorithms, etc.) can be used to align or register the reference and non-reference images with each other. For one example, the diffeomorphic image registration algorithm can be used alone or combined with at least one other image alignment/registration technique.

For one embodiment, the AFS logic/module 140 generates a foreground mask using data acquired from the reference and non-reference images. The foreground mask can be used to identify each pixel in reference image as a foreground pixel (i.e., a pixel identifying a foreground in the reference image) or a background pixel (i.e., a pixel identifying a background in the reference image). The foreground mask can be used to apply transformations to either the foreground pixels only or the background pixels only. The foreground mask can be an initial foreground mask or an updated foreground mask. The AFS logic/module 140 can generate a foreground mask using data acquired from the reference and non-reference images by generating an initial foreground mask and subsequently generating an updated foreground mask based on the initial foreground mask. Other embodiments, however, are not so limited. For example, the foreground mask can be the initial foreground mask. That is, the AFS logic/module 140 generates the initial foreground mask without subsequently generating an updated foreground mask.

The AFS logic/module 140 can generate the initial foreground mask based on an identification of initial foreground pixels in the first image. For one embodiment, the AFS logic/module 140 identifies the initial foreground pixel(s) in the reference image using an initial foreground confidence map. As used herein, an "initial foreground confidence map" and its variations refer to a collection of initial confidence values, which denote levels of confidence that pixels in the reference image are part of a captured scene's foreground. Thus, in an initial foreground confidence map, each initial confidence value denotes a level of confidence that a pixel or a pixel neighborhood in the reference image is part of a captured scene's foreground. The AFS logic/module 140 determines initial confidence values by comparing sharpness values for pixels in the reference image with corresponding sharpness values for pixels in the non-reference image.

For one embodiment, the AFS logic/module 140 equates a pixel's sharpness with the pixel's gradient. As used herein, a "pixel" and its variations refers to a controllable element of an image represented on a display device as a location. As used herein, a "pixel's sharpness" and its variations refer to a value that represents an image's sharpness at the pixel's location. As used herein, a "pixel's gradient" and its variations refer to one or more values representing the change in intensity of that pixel in a given direction (e.g., the x-direction, the y-direction, etc.). At least one technique of computing a pixel's gradient includes computing the gradient as a vector, whose components measure how rapidly the pixel's intensity values are changing with distance in at least one of the x-direction or y-direction.

Figure 1B:
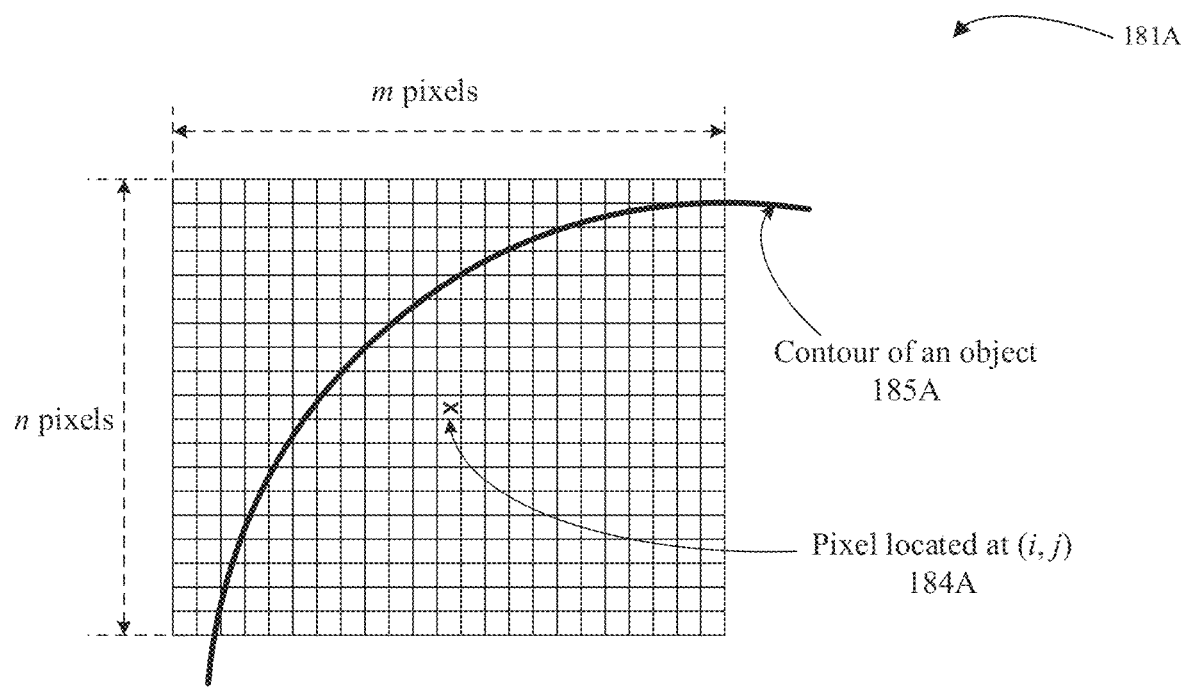
FIGS. 1B-1C illustrate, in block diagram form, a portion of a reference image and a corresponding portion of a non-reference image, respectively, according to one embodiment.
Figure 1C:
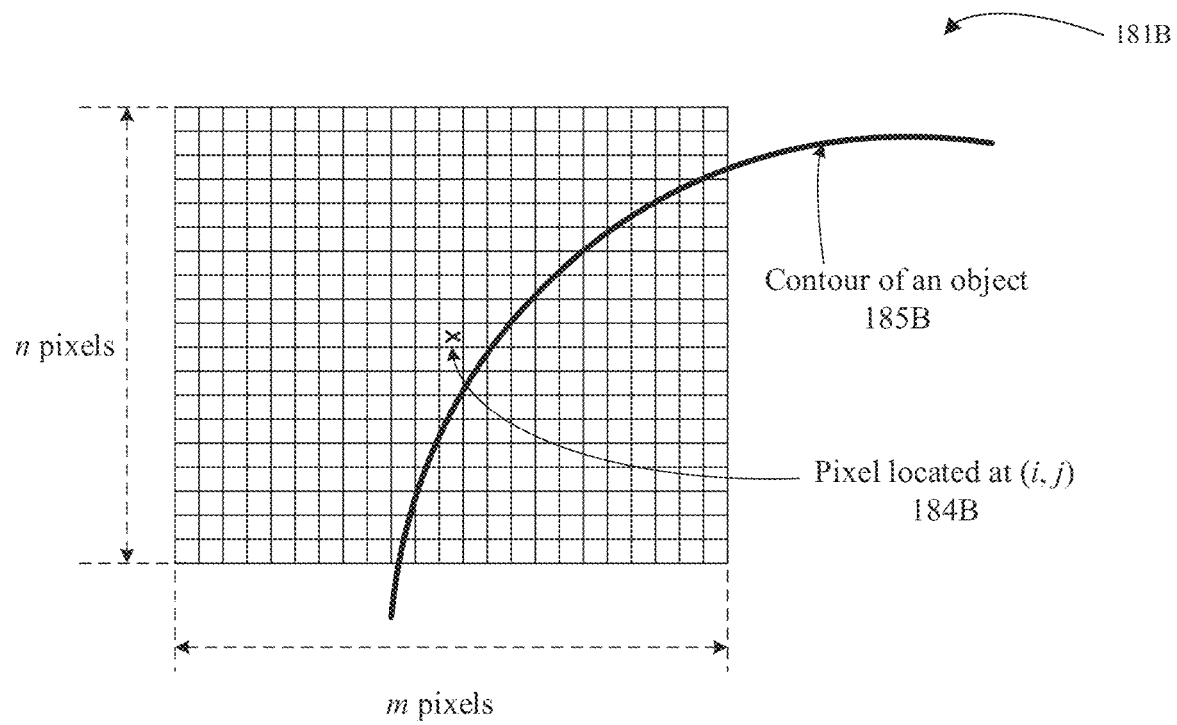

Referring now to FIGS. 1B and 1C, which illustrate a portion in a reference image 181A and a corresponding portion in a non-reference image 181B, respectively, according to one embodiment. For brevity, the portion in the reference image 181A illustrated in FIG. 1B is referred to as the reference image portion 181A and the corresponding portion in the non-reference image 181B illustrated in FIG. 1C is referred to as the non-reference image portion 181B. The image portions 181A-B can be part of images in an AFS, as described above in connection with FIG. 1A.

In FIGS. 1B-1C, each of the image portions 181A-B is represented as a grid of m×n pixels. As explained above, the AFS logic/module 140 may align or register the reference image and the non-reference image with each other to compensate for any shifting between capturing the two images. After applying image alignment or registration, each pixel in the reference image matches the pixel at the same location of the non-reference image. For example, in FIGS. 1B-1C, each pixel in the reference image portion 181A matches the pixel at the same location in the non-reference image portion 181B after the AFS logic/module 140 applies image alignment or registration techniques. For a specific example, the pixels 184A-B are located at the same position (i, j) in the image portions 181A-B, respectively. As shown in FIGS. 1B-1C, the pixel 184A in the reference image portion 181A may lie inside the contour 185A of an object, while the pixel 184B in the non-reference image portion 181B may lie outside the contour 185B of the same object. Consequently, the pixels 181A-B may lie in different positions with respect to the contour 185A-B. This difference can occur when the reference and non-reference images of a captured object are not exactly identical, which may be caused by shifting during the capture of an AFS, and/or by inaccuracies in image alignment or registration techniques.

The AFS logic/module 140 may determine a gradient and a sharpness for each of the pixels 184A-B. For a first example, and with regard to FIG. 1B, the AFS logic/module 140 represents a gradient for the pixel 184A located at position (i, j) in the reference image portion 181A as $G_{ref}(i, j)$. For this first example, the AFS logic/module 140 determines that the sharpness for the pixel 184A, which can be represented as $S_{ref}(i, j)$, is equal to the gradient $G_{ref}(i, j)$. For a second example, and with regard to FIG. 1C, the AFS logic/module 140 represents a gradient for the pixel 184B located at position (i, j) in the non-reference image portion 181B as $G_{nonref}(i, j)$. For this second example, the AFS logic/module 140 determines that the sharpness for the pixel 184B, which can be represented as $S_{nonref}(i, j)$, is equal to the gradient $G_{nonref}(i, j)$.

For one embodiment, the AFS logic/module 140 equates a pixel's sharpness with an overall sharpness value of a given pixel neighborhood associated with that specific pixel. As used herein, a "pixel neighborhood," a "neighborhood of pixels," and their variations refer to a predetermined group of pixels having a specific relationship with a given pixel. For a specific embodiment, a pixel neighborhood and its variations refer to a predetermined group of pixels centered around a given pixel in a grid of pixels. For example, in a rectangular grid of pixels, a pixel may be adjacent to eight neighboring pixels, and as a result, a pixel neighborhood associated with that specific pixel can encompass the pixel and its eight neighboring pixels (i.e., nine pixels). A pixel neighborhood can also include a larger or smaller group of pixels having a specific relationship with a given pixel. Thus, a pixel neighborhood can encompass at least 2 pixels. For example, a pixel neighborhood can encompass 2 pixels, 3 pixels, 4 pixels, 5 pixels, 6 pixels, 16 pixels, 64 pixels, 256 pixels, 1024 pixels, etc. For one embodiment, the AFS logic/module 140 computes the overall sharpness value for a pixel neighborhood using any combination of the individual pixels' gradients in the pixel neighborhood. Combinations include, but are not limited to, a sum of the individual pixels' gradients, an average of the individual pixels' gradients, a median of the individual pixels' gradients, and a vector of the individual pixels' gradients.

For a specific embodiment, the AFS logic/module 140 determines an examined pixel's sharpness by summing the individual pixels' gradients in a given pixel neighborhood associated with the examined pixel. For a first example, and with regard to FIG. 1B, the AFS logic/module 140 represents a grid of m×n pixels as a pixel neighborhood associated with the pixel 184A that is located at position (i, j) in the reference image portion 181A. For this first example, the AFS logic/module 140 determines a gradient for each pixel located at position (k, l) in the grid of m×n pixels that represents the reference image portion 181A as $G_{ref}(k, l)$, where k=1, 2, . . . m, and where l=1, 2, . . . n. Thus, for this first example, the AFS logic/module 140 determines the sharpness for the pixel 184A located at position (i, j) in the reference image portion 181A as $S_{ref}(i, j)$, which can be represented in the following manner:

$$S_{ref}(i, j) = \sum_{k=1}^{m} \sum_{l=1}^{n} G_{ref}(k, l)$$

For a second example, and with regard to FIG. 1C, the AFS logic/module 140 represents a grid of m×n pixels as a pixel neighborhood associated with the pixel 184B that is located at position (i, j) in the non-reference image portion 181B. For this second example, the AFS logic/module 140 determines a gradient for each pixel located at position (k, l) in the grid of m×n pixels that represents the non-reference image portion 181B as $G_{nonref}(k, l)$, where k=1, 2, ... m, and where l=1, 2, ... n. Thus, for this second example, the AFS logic/module 140 determines the sharpness for the pixel 184B located at position (i, j) in the non-reference image portion 181B as $S_{nonref}(i, j)$, which can be represented in the following manner:

$$S_{nonref}(i, j) = \sum_{k=1}^{m} \sum_{l=1}^{n} G_{nonref}(k, l)$$

As explained above, the AFS logic/module 140 can compute the overall sharpness value for a pixel neighborhood using any combination of the individual pixels' gradients in the pixel neighborhood. For another embodiment, the AFS logic/module 140 computes the overall sharpness value for a pixel neighborhood as a weighted combination of the individual pixels' gradients in the pixel neighborhood. This weighted combination can be achieved using a bilateral filter (and/or any variants of a bilateral filter), where each gradient is weighted and used to compute a weighted overall sharpness value for the pixel neighborhood. The weights can be based on a Gaussian or other chosen distribution. The weights can depend on Euclidean distances of pixels and/or on radiometric differences (e.g., range differences, such as color intensities, depth distances, etc.). For one embodiment, a bilateral filter (and/or any variants of a bilateral filter) can assist with preserving sharp edges by adjusting weights based on relationships between adjacent pixels. Variants of bilateral filters include, but are not limited to, cross bilateral filters (also known as a joint bilateral filters) and dual bilateral filters.

For a specific embodiment, the AFS logic/module 140 uses a cross bilateral filter to compute the weighted overall sharpness value for a pixel neighborhood. The cross bilateral filter can assist with preserving edges and reducing unwanted effects of alignment inaccuracies. For one embodiment, and with regard to FIG. 1B, the AFS logic/module 140 computes the sharpness for the pixel 184A located at position (i, j) in the reference image portion 181A as a weighted overall sharpness value for a grid of m×n pixels representing a pixel neighborhood of the pixel 184A in the reference image portion 181A using the following equation:

$$S_{ref}(i, j) = \sum_{k=1}^{m} \sum_{l=1}^{n} [w_{ref}(i, j, k, l) \times G_{ref}(k, l)]$$

where (i, j) is the position of the pixel 184A in the reference image portion 181A shown in FIG. 1B,
where m, n are the size of the m×n pixel grid representing a pixel neighborhood associated with the pixel 184A in the reference image portion 181A shown in FIG. 1B,
where (k, l) is the position of the $(k, l)^{th}$ pixel in the m×n pixel grid representing the pixel neighborhood associated with the pixel 184A in the reference image portion 181A shown in FIG. 1B,
where k=1, 2, ... m,
where l=1, 2, ... n,
where $S_{ref}(i, j)$ is the sharpness for the pixel 184A,
where $G_{ref}(k, l)$ is the gradient for the $(k, l)^{th}$ pixel in the pixel neighborhood associated with the pixel 184A, and where $w_{ref}(i, j, k, l)$ is the weight applied to the $G_{ref}(k, l)$ based on the relationship of the $(k, l)^{th}$ pixel in the pixel neighborhood with respect to the pixel 184A.

For an embodiment, and with regard to FIG. 1B, the AFS logic/module 140 computes the weight $w_{ref}(i, j, k, l)$ using the following equation:

$$w_{ref}(i, j, k, l) = e^{-K_{color} \times (\Delta_{color\_ref}(i,j,k,l))^2} \times (1 - K_{geo} \times \Delta_{geo\_ref}(i, j, k, l))$$

where $K_{color}$ and $K_{geo}$ are parameters for tuning the weight $w_{ref}(i, j, k, l)$ and are obtained empirically based on an analysis of image data from many different scenes,
where $\Delta_{color\_ref}(i, j, k, l)$ is a color difference between the pixel 184A located at position (i, j) in the reference image portion 181A shown in FIG. 1B and the $(k, l)^{th}$ pixel located at position (k, l) in the pixel neighborhood associated with the pixel 184A, and
where $\Delta_{geo\_ref}(i, j, k, l)$ is a geometric distance between the pixel 184A located at position (i, j) in the reference image portion 181A shown in FIG. 1B and the $(k, l)^{th}$ pixel located at position (k, l) in the pixel neighborhood associated with the pixel 184A.

For an embodiment, and with regard to FIG. 1B, the AFS logic/module 140 computes the color difference $\Delta_{color\_ref}(i, j, k, l)$ using the following equation:

$$\Delta_{color\_ref}(i,j,k,l) = |YUV_{ref}(k,l) - YUV_{ref}(i,j)|$$

where $YUV_{ref}(i, j)$ is a value representing the YUV pixel data for the pixel 184A located at position (i, j) in the reference image portion 181A that is shown in FIG. 1B, and
where $YUV_{ref}(k, l)$ is a value representing the YUV pixel data for the $(k, l)^{th}$ pixel located at position (k, l) in the pixel neighborhood associated with the pixel 184A.

For the immediately preceding embodiment, the AFS logic/module 140 computes the color difference using YUV pixel data. Nevertheless, it is to be appreciated that other types of pixel data can be used—for example, RGB pixel data, CMYK pixel data, HSL or HSV pixel data, etc. Also, the equation shown in the immediately preceding paragraph is but one way of determining a color difference between two pixels. For one example, the color difference may be a Delta E (or ΔE) value that is calculated using one or more Delta E computation techniques, which are known. Delta E (or ΔE) is a color difference metric developed by the International Commission on Illumination (CIE). For another example, and with regard to FIG. 1B, the AFS logic/module 140 computes the color difference $\Delta_{color\_ref}(i, j, k, l)$ using the following equation:

$$\Delta_{color\_ref}(i,j,k,l) = \sqrt{[Y_{ref}(k,l) - Y_{ref}(i,j)]^2 \times [U_{ref}(k,l) - U_{ref}(i,j)]^2 \times [V_{ref}(k,l) - V_{ref}(i,j)]^2}$$

where $Y_{ref}(i, j)$ is a value representing the luminance for the pixel 184A located at position (i, j) in the reference image portion 181A that is shown in FIG. 1B,
where $U_{ref}(i, j)$ and $V_{ref}(i, j)$ are values representing the chrominance components for the pixel 184A located at position (i, j) in the reference image portion 181A that is shown in FIG. 1B,
where $Y_{ref}(k, l)$ is a value representing the luminance for the $(k, l)^{th}$ pixel located at position (k, l) in the pixel neighborhood associated with the pixel 184A, and where $U_{ref}(k, l)$ and $V_{ref}(k, l)$ are values representing the chrominance components for the $(k, l)^{th}$ pixel located at position $(k, l)$ in the pixel neighborhood associated with the pixel 184A.

With regard again to FIG. 1B, the AFS logic/module 140 computes the geometric difference $\Delta_{geo\_ref}(i, j, k, l)$ using the following equation:

$$\Delta_{geo\_ref}(i,j,k,l) = \sqrt{[(k-i)^2 \times (l-j)^2]}$$

where $(i, j)$ is the position of the pixel 184A in the reference image portion 181A shown in FIG. 1B, and where $(k, l)$ is the position of the $(k, l)^{th}$ pixel in the pixel neighborhood associated with the pixel 184A.

For the immediately preceding embodiment, the AFS logic/module 140 computes the geometric difference $\Delta_{geo\_ref}(i, j, k, l)$ using a specific equation. Nevertheless, it is to be appreciated that the geometric distance can be computed using other equations. For example, the AFS logic/module 140 may compute the geometric distance as follows:

$$\Delta_{geo\_ref}(i,j,k,l) = |k-i| + |l-j|$$

where $(i, j)$ is the position of the pixel 184A in the reference image portion 181A shown in FIG. 1B, and where $(k, l)$ is the position of the $(k, l)^{th}$ pixel in the pixel neighborhood associated with the pixel 184A.

le;.5qFor one embodiment, and with regard to FIG. 1C, the AFS logic/module 140 computes the sharpness for the pixel 184B located at position $(i, j)$ in the non-reference image portion 181B as the weighted overall sharpness value for a grid of m×n pixels representing a pixel neighborhood associated with the pixel 184B in the non-reference image 181B using the following equation:

$$S_{nonref}(i, j) = \sum_{k=1}^{m} \sum_{l=1}^{n} [w_{nonref}(i, j, k, l) \times G_{nonref}(k, l)]$$

where $(i, j)$ is the position of the pixel 184B in the non-reference image portion 181B shown in FIG. 1C, where m, n are the size of the m×n pixel grid representing a pixel neighborhood associated with the pixel 184B in the non-reference image portion 181B shown in FIG. 1C, where $(k, l)$ is the position of the $(k, l)^{th}$ pixel in the m×n pixel grid representing the pixel neighborhood associated with the pixel 184B in the non-reference image portion 181B shown in FIG. 1C, where k=1, 2, . . . m, where l=1, 2, . . . n, where $S_{nonref}$ is the sharpness for the pixel 184B, where $G_{nonref}(k, l)$ is the gradient for the $(k, l)^{th}$ pixel in the pixel neighborhood associated with the pixel 184B, and where $w_{nonref}(i, j, k, l)$ is the weight applied to the $G_{nonref}(k, l)$ based on the relationship of the $(k, l)^{th}$ pixel in the pixel neighborhood with respect to the pixel 184B.

For an embodiment, and with regard to FIG. 1C, the AFS logic/module 140 computes the weight $w_{nonref}(i, j, k, l)$ using the following equation:

$$w_{nonref}(i, j, k, l) = e^{-K_{color} \times (\Delta_{color\_nonref}(i,j,k,l))^2} \times (1 - K_{geo} \times \Delta_{geo\_nonref}(i, j, k, l))$$

where $K_{color}$ and $K_{geo}$ are parameters for tuning the weight $w_{nonref}(i, j, k, l)$ and are obtained empirically based on an analysis of image data from many different scenes, where $\Delta_{color\_nonref}(i, j, k, l)$ is a color difference between the pixel 184A located at position $(i, j)$ in the reference image portion 181A shown in FIG. 1B and the $(k, l)^{th}$ pixel located at position $(k, l)$ in the pixel neighborhood associated with the pixel 184B that is located at position $(i, j)$ in the non-reference image portion 181B shown in FIG. 1C, and where $\Delta_{geo\_nonref}(i, j, k, l)$ is a geometric distance between the pixel 184B located at position $(i, j)$ in the non-reference image portion 181B shown in FIG. 1C and the $(k, l)^{th}$ pixel located at position $(k, l)$ in the pixel neighborhood associated with the pixel 184B.

For an embodiment, and with regard to FIGS. 1B-1C, the AFS logic/module 140 computes the color difference $\Delta_{color\_nonref}(i, j, k, l)$ using the following equation:

$$\Delta_{color\_nonref}(i,j,k,l) = |YUV_{nonref}(k,l) - YUV_{ref}(i,j)|$$

where $YUV_{ref}(i, j)$ is a value representing the YUV pixel data for the pixel 184A located at position $(i, j)$ in the reference image portion 181A that is shown in FIG. 1B, and where $YUV_{nonref}(k, l)$ is a value representing the YUV pixel data for the $(k, l)^{th}$ pixel located at position $(k, l)$ in the pixel neighborhood associated with the pixel 184B that is located at position $(i, j)$ in the non-reference image portion 181B shown in FIG. 1C.

As shown in the immediately preceding embodiment, even though the AFS logic/module 140 computes the color difference using YUV pixel data, it is to be appreciated that other types of pixel data can be used (as described above). Also, the equation shown in the immediately preceding paragraph is but one way of determining a color difference between two pixels (as described above). It is to be appreciated that the color difference equations used to compute $\Delta_{color\_ref}(i, j, k, l)$ above can also be used to compute $\Delta_{color\_nonref}(i, j, k, l)$.

Referring again to FIG. 1C, the AFS logic/module 140 can compute the geometric difference $\Delta_{geo\_nonref}(i, j, k, l)$ using the following equation:

$$\Delta_{geo\_nonref}(i,j,k,l) = \sqrt{[(k-i)^2 \times (1-j)^2]}$$

where $(i, j)$ is the position of the pixel 184B in the non-reference image portion 181B shown in FIG. 1C, and where $(k, l)$ is the position of the $(k, l)^{th}$ pixel in the pixel neighborhood associated with the pixel 184B.

For the immediately preceding embodiment, the AFS logic/module 140 computes the geometric difference $\Delta_{geo\_nonref}(i, j, k, l)$ using a specific equation. Nevertheless, it is to be appreciated that the geometric distance can be computed using other equations. For example, the AFS logic/module 140 may compute the geometric distance as follows:

$$\Delta_{geo\_nonref}(i,j,k,l) = |k-i| + |l-j|$$

where $(i, j)$ is the position of the pixel 184B in the non-reference image portion 181B shown in FIG. 1C, and where (k, l) is the position of the (k, l)$^{th}$ pixel in the pixel neighborhood associated with the pixel 184B.

For one embodiment, and referring again to FIG. 1A, the AFS logic/module 140 can determine an initial confidence value for each pixel in the reference image using pseudo-code as follows:

if $S_{ref}(i, j) > Th_{noise}$ && $S_{ref}(i, j) >= S_{nonref}(i, j)$,
  then $C_{ref\_foreground}(i, j) = 1 - [S_{nonref}(i, j) \div S_{ref}(i, j)]$;
else if $S_{nonref}(i, j) > Th_{noise}$ && $S_{ref}(i, j) < S_{nonref}(i, j)$,
  then $C_{ref\_foreground}(i, j) = 0$;
else $C_{ref\_foreground}(i, j)$=undetermined.

where a pixel in an image is represented or located at (i, j),
  where an image can be the reference image or the non-reference image,
  where $C_{ref\_foreground}(i, j)$ is the initial confidence value of the pixel located at (i, j) in the reference image,
  where $S_{ref}(i, j)$ is the sharpness for the pixel located at (i, j) in the reference image,
  where $S_{nonref}(i, j)$ is the sharpness for the pixel located at (i, j) in the non-reference image (assuming the reference and non-reference images have been aligned by one or more image registration techniques as described above), and
  where $Th_{noise}$ is a measure of a minimum acceptable sharpness value that accounts for noise within the data representing the reference and/or non-reference image.

For example, and with regard to FIG. 1B, the AFS logic/module 140 determines an initial confidence value for each pixel in the m×n grid that represents the reference image portion 181A using the pseudo-code shown above in the immediately preceding paragraph. For this example, the AFS logic/module 140 determines the initial confidence value for each pixel in the reference image portion 181A based on data from the reference image portion 181A and the non-reference image portion 181B, as described above.

Returning to FIG. 1A, the initial foreground confidence map can comprise the determined initial confidence values. For one embodiment, the AFS logic/module 140 can perform standard thresholding or connected component techniques to identify one or more initial foreground pixels in the reference image that are to be covered by the initial foreground mask. For example, and for one embodiment, the AFS logic/module 140 identifies initial foreground pixel(s) in the reference image as pixel(s) having initial confidence values that are equal to or greater than a confidence threshold. Also, the AFS logic/module 140 may identify initial background pixel(s) in the reference image as pixel(s) having initial confidence values that are less than the confidence threshold or undetermined. The initial background pixel(s) will not be covered by the initial foreground mask.

For one embodiment, the AFS logic/module 140 identifies the initial foreground pixel(s) using an initial foreground confidence map, as described above in the preceding paragraphs. For a further embodiment, the AFS logic/module 140 identifies the initial foreground pixel(s) using an initial foreground confidence map and a depth map.

A depth map characterizing depth information about objects in an image can be used to enhance or complement one or more embodiments of the AFS techniques described herein. It is to be appreciated that the AFS techniques described herein do not require a depth map. This is because the data associated with the depth values are generally approximate values that are based on estimates or incomplete information/analysis. Moreover, knowledge of depth information about objects in an image might not provide clues as to where the foreground object(s) in an image are located. Depth information about objects in an image that is organized in a depth map can be obtained through various techniques. These techniques include, but are not limited to, using stereo cameras, using structured light cameras, using time-of-flight cameras, and using laser scanning. For an embodiment, the system 100 (e.g., the imaging device 120, the peripheral 190, etc.) is configured to perform one or more of the techniques set forth in the immediately preceding sentence.

For one embodiment, after the AFS logic/module 140 identifies initial foreground pixel(s) in the reference image using an initial foreground confidence map as described above, then the AFS logic/module 140 retrieves or receives corresponding depth values associated with the initial foreground pixel(s) in the reference image from a depth map. For one embodiment, the AFS logic/module 140 determines a depth histogram from the corresponding depth values associated with the initial foreground pixel(s) in the reference image. The AFS logic/module 140 can then determine a peak depth value in the determined depth histogram. For one embodiment, the peak depth value indicates an approximate average depth value of the foreground object(s) in an image. Next, and for one embodiment, the AFS logic/module 140 automatically determines a depth range around the peak depth value, and subsequently, the AFS logic/module 140 selects any pixels in the reference image whose depths fall within this range from all pixels in reference image (including the initial foreground pixels and the initial background pixels that were determined using only the initial foreground confidence map). For one embodiment, the AFS logic/module designates the pixel(s) that are selected using the initial foreground confidence map and the depth map as the initial foreground pixel(s) to be masked by the initial foreground mask. When a depth map is used with an initial foreground confidence map, the AFS logic/module may designate any unselected pixel(s) as the initial background pixel(s). The use of the depth map together with the initial foreground confidence map can assist with reducing the likelihood of misclassifying initial foreground pixel(s) as initial background pixel(s) and vice versa.

The AFS logic/module 140 can generate the initial foreground mask to mask the initial foreground pixel(s). That is, the AFS logic/module 140 generates the initial foreground mask to mask the initial foreground pixel(s) in the reference image without masking the initial background pixel(s) in the reference image. The AFS logic/module 140 may use one or more signal processing filters to remove or eliminate from consideration small regions from the initial foreground mask that may be caused by noise before any subsequent processing. These regions may be determined based on size or spatial distance from other identified pixel(s) in the reference image.

After generating the initial foreground mask, the AFS logic/module 140 can generate an updated foreground mask. For one embodiment, the AFS logic/module 140 begins generating the updated foreground mask by extracting a contour band from the initial foreground mask. The contour band encompasses pixels in the reference image that are located around edges of the initial foreground mask. In this way, the contour band includes the following: (i) some of the initial foreground pixels that are masked by the initial foreground mask; and (ii) some of the initial background pixels that are not masked by the initial foreground mask. For one embodiment, extracting the contour band begins by detecting edges of the initial foreground mask. The edges of the initial foreground mask can be determined using one or more edge detection techniques. Edge detection techniques include, but are not limited to, gradient based edge detection techniques, zero crossing based edge detection techniques, and any other edge detection techniques. For one embodiment, the initial foreground mask is an image of binary values or a small number of values. Consequently, and for this embodiment, edges of the initial foreground mask can be detected by locating borders between binary values or the small number of values. For one embodiment, the contour band covers the edges of the initial foreground mask such that the edges lie in the middle of the band. That is, and for one embodiment, about half of the reference image's pixels that are defined by the contour band are associated with the initial foreground mask (i.e., the initial foreground pixels), while the other half of the reference image's pixels that are defined by the contour band are not associated with the initial foreground mask (i.e., initial background pixels).

For one embodiment, the AFS logic/module 140 determines foreground contour confidence values and background contour confidence values for each pixel in the reference image defined by the contour band. For one embodiment, the foreground contour confidence value of each pixel in the reference image defined by the contour band indicates a degree of certainty that the pixel is part of the foreground. Also, and for one embodiment, the background contour confidence value of each pixel in the reference image defined by the contour band indicates a degree of certainty that the pixel is part of the background.

For one embodiment, the AFS logic/module 140 determines the foreground contour confidence values and the background contour confidence values by determining a sharpness for each pixel in the reference image defined by the contour band. Specifically, the AFS logic/module 140 applies a bilateral filter or a variant of a bilateral filter when the AFS logic/module 140 determines the sharpness for each pixel in the reference image defined by the contour band. Bilateral filters (and/or any variants of a bilateral filter) are described above.

For one embodiment, the AFS logic/module 140 applies a cross bilateral filter during the determination of an examined pixel's sharpness to add additional information to the overall sharpness value for a given pixel neighborhood associated with the examined pixel. The AFS logic/module 140 may apply a cross bilateral filter as described above in connection with FIGS. 1B-1C. The AFS logic/module 140 may apply the cross bilateral filter because the cross bilateral filter does not treat all neighboring pixels in the given pixel neighborhood equally. Instead, and for one embodiment, the AFS logic/module 140 uses the cross bilateral filter to assign a weight to each neighboring pixel in the given pixel neighborhood based on the neighboring pixel's color difference and spatial distance from the examined pixel in the reference image. This may result in an edge-preserving benefit that can assist with preventing and/or compensating for misalignment between the reference image and the non-reference image.

For one embodiment, the AFS logic/module 140 determines the foreground contour confidence value of each pixel in the reference image defined by the contour band using pseudo-code as follows:

if $S_{ref\_weighted}(i, j) > Th_{noise}$ weighted && $S_{ref\_weighted}(i, j) >= S_{nonref\_weighted}(i, j)$,
then $C_{contour\_ref\_foreground}(i, j) = 1 - [S_{nonref\_weighted}(i, j) \div S_{ref\_weighted}(i, j)]$;
else if $S_{nonref\_weighted}(i, j) > Th_{noise\_weighted}$ && $S_{ref\_weighted}(i, j) < S_{nonref\_weighted}(i, j)$,
then $C_{contour\_ref\_foreground}(i, j) = 0$;
else $C_{contour\_ref\_foreground}(i, j) =$ undetermined.

where a pixel in an image that is defined by the contour band is represented or located at (i, j), where the image can be the reference image or the non-reference image, where $C_{contour\_ref\_foreground}(i, j)$ is the foreground contour confidence value of the pixel in the reference image that is defined by the contour band and is located at (i, j), where $S_{ref\_weighted}(i, j)$ is the weighted overall sharpness value for the pixel neighborhood associated with pixel in the reference image that is defined by the contour band and is located at (i, j), where $S_{nonref\_weighted}(i, j)$ is the weighted overall sharpness value for the pixel neighborhood associated with the pixel in the non-reference image that is defined by the contour band and is located at (i, j), and where $Th_{noise\_weighted}$ is a measure of a minimum acceptable sharpness value to account for noise within the data representing the reference and/or non-reference image.

For one embodiment, the AFS logic/module 140 determines the background contour confidence value of each pixel in the reference image defined by the contour band using pseudo-code as follows:

if $S_{nonref\_weighted}(i, j) > Th_{noise\_weighted}$ && $S_{nonref\_weighted}(i, j) >= S_{ref\_weighted}(i, j)$,
then $C_{contour\_ref\_background}(i, j) = 1 - [S_{ref\_weighted}(i, j) \div S_{nonref\_weighted}(i, j)]$;
else if $S_{ref\_weighted}(i, j) > Th_{noise}$ && $S_{nonref\_weighted}(i, j) < S_{ref\_weighted}(i, j)$,
then $C_{contour\_ref\_background}(i, j) = 0$;
else $C_{contour\_ref\_background}(i, j) =$ undetermined.

where a pixel in an image that is defined by the contour band is represented or located at (i, j), where the image can be reference image or the non-reference image, where $C_{contour\_ref\_background}(i, j)$ is the background contour confidence value of the pixel in the reference image that is defined by the contour band and is located at (i, j), where $S_{ref\_weighted}(i, j)$ is the weighted overall sharpness value for the pixel neighborhood associated with pixel in the reference image that is defined by the contour band and is located at (i, j), where $S_{nonref\_weighted}(i, j)$ is the weighted overall sharpness value for the pixel neighborhood associated with the pixel in the non-reference image that is defined by the contour band and is located at (i, j), and where $Th_{noise}$ weighted is a measure of a minimum acceptable sharpness value to account for noise within the data representing the reference and/or non-reference image.

After the AFS logic/module 140 determines the foreground contour confidence values and the background contour confidence values for each pixel in the reference image defined by the contour band, the AFS logic/module 140 can update the initial foreground pixel(s) in the reference image. For one embodiment, the AFS logic/module 140 updates the initial foreground pixel(s) using the foreground contour confidence values and the background contour confidence values. For one embodiment, the AFS logic/module 140 updates the initial foreground pixel(s) by removing or excluding one or more pixels defined by the contour band that were initially identified as part of the initial foreground pixel(s) and masked by the initial foreground mask. This initial identification can be performed using the initial foreground confidence map (and optionally the depth map), as described above. For the sake of brevity, each of these excluded pixels defined by the contour band is referred to herein as a background contour pixel. For another embodiment, the AFS logic/module 140 updates the initial foreground pixel(s) by adding or including one or more pixels defined by the contour band that were not initially identified as part of the initial foreground pixel(s) to be covered by the initial foreground mask (e.g., the initial background pixel(s), etc.). As explained above, this initial identification can be performed using the initial foreground confidence map (and optionally the depth map). For the sake of brevity, each included pixel defined by the contour band is referred to herein as a foreground contour pixel.

For one embodiment, the AFS logic/module 140 determines each of the background contour pixel(s) (i.e., the excluded pixel(s) defined by the contour band) as a pixel in the reference image whose background contour confidence value is larger than its foreground contour confidence value by at least a first specified threshold. That is, for each of the excluded pixel(s), a difference between its background contour confidence value and its foreground contour confidence value is greater than or equal to a first threshold difference when the background contour confidence value is larger than the foreground contour confidence value. For one embodiment, the AFS logic/module 140 determines each of the foreground contour pixel(s) (i.e., the included pixel(s) defined by the contour band) as a pixel in the reference image whose foreground contour confidence value is greater than its background contour confidence value by at least a second specified threshold. That is, for each of the included pixel(s), a difference between its foreground contour confidence value and its background contour confidence value is greater than or equal to a second threshold difference when the foreground contour confidence value is larger than the background contour confidence value. For one embodiment, the first and second specified thresholds described above can be determined empirically from a large number of AFS captures of many different scenes.

As explained above, at least one of the embodiments described herein can be complemented or enhanced by a depth map (when such information is available). For at least one embodiment, the AFS logic/module 140 can optionally receive or obtain a depth confidence map corresponding to an optional depth map from the memory 160 or from some other source (e.g., another processing unit, imaging device 120, imaging device 220, etc.). As used herein, a "depth confidence map" and its variations refer to a collection of depth confidence values, which denote levels of confidence that pixels in the reference image have the depths assigned to them in the depth map. Thus, in a depth confidence map, each depth confidence value denotes a level of confidence that a pixel in the reference image does have the depth that it (i.e., the pixel) is assigned in the depth map. One method for generating the depth confidence map is by an image matching metric. For example, when stereo cameras are used to generate a depth map, then a pixel in the right image can be located using a disparity value computed from the depth value of the corresponding pixel in the left image. For this example, a matching score between each pixel in the left image and its corresponding pixel in the right image can be computed based on color or spatial distance. Also, some other measurement (e.g., a degree of similarity between corresponding pixels in the two images, etc.) can be computed to represent the level of confidence that the pixel has the correct depth value. Matching scores can be computed from examined pixels or from one or more pixels in given pixel neighborhoods associated with the examined pixels.

For at least one embodiment, when the AFS logic/module 140 obtains or receives a depth map and its corresponding depth confidence map, then the AFS logic/module 140 includes the depth confidence values into the determination of background contour pixels and the foreground contour pixels. For a first example, and for one embodiment, the AFS logic/module 140 determines each of the background contour pixels as a pixel in the reference image defined by the contour band whose background contour confidence value is larger than its foreground contour confidence value by at least a first specified threshold and whose depth confidence value is equal to or less than a first depth confidence threshold. This first depth confidence threshold can be used to exclude those background contour pixels from the reference image that have a low depth confidence value. For a second example, and for one embodiment, the AFS logic/module 140 determines each of the foreground contour pixels as a pixel in the reference image defined by the contour band whose foreground contour confidence value is larger than its background contour confidence value by at least a second specified threshold and whose depth confidence value is equal to or less than a second depth confidence threshold. This second depth confidence threshold can be used to include those foreground contour pixels from the reference image that have a low depth confidence value. Determining what constitutes a low depth confidence value or a high depth confidence value depends on the application in question. For example, when using stereo cameras to generate depth maps, a low depth confidence value can be assigned to pixels in the occluded areas of one camera image that lack corresponding pixels in the other camera image (i.e., areas that are visible in one camera but invisible in the other). Another example is that pixels belonging to the flat, textureless areas in a scene (e.g. a uniformly colored wall, etc.) can include many matches representing different depth values and, as a result, these flat textureless areas can be assigned low depth confidence values. It is to be appreciated that other techniques of determining low/high depth confidence values are possible. The examples in this paragraph are merely illustrative.

After the AFS logic/module 140 has updated the initial foreground pixel(s) to exclude background contour pixel(s) and/or include foreground contour pixel(s) using the information acquired from the contour band, then the AFS logic/module 140 can generate an updated foreground mask. For one embodiment, the AFS logic/module 140 generates the updated foreground mask to: (i) mask the initial foreground pixel(s) without masking the initial background pixel(s); and (ii) mask the foreground contour pixel(s) defined by the contour band without masking the background contour pixel(s) in the reference image defined by the contour band. For the sake of brevity, the pixels to be masked by the updated foreground mask can be collectively referred to as updated foreground pixels and the pixels that will not be masked by the updated foreground mask can be collectively referred to as updated background pixels.

One or more pixels in the reference image that lack sufficient information for being classified can be added to the updated foreground pixels. For one embodiment, the AFS logic/module 140 can generate and apply one or more additional masks to determine that pixel(s) lacking sufficient information in the reference image are part of the foreground in the reference image. For one embodiment, the additional masks are applied to pixel(s) in the reference image that lack sufficient information and are encompassed by the contour band. The additional mask(s) can be used to further refine the updated foreground pixel(s) that are to be masked by the updated foreground mask when the AFS lacks enough information to classify one or more pixels in the reference image as part of the foreground in the reference image and/or the background in the reference image. As used herein, a pixel lacks sufficient information when one or more values associated with the pixel are below one or more respective threshold levels. Obstacles that can cause pixels to lack sufficient information can, for example, include highlight artifacts, color mismatches, and/or focus irregularities. Each of these obstacles can prevent the AFS logic/module 140 from acquiring information from one or more pixels in the reference image and/or one or more pixels in the non-reference image because the obstacles may cause one or more values associated with pixel(s) in the reference image and/or the non-reference image from being above one or more respective threshold levels. Highlight artifacts and color mismatches can, for example, occur because of clipping that affects pixel(s) in the reference image and/or pixel(s) in the non-reference image. Focus irregularities can, for example, occur when one or more pixels of an intended foreground are sharper in the non-reference image than in the reference image.

For one embodiment, the one or more additional masks include at least one of a highlight mask, a color mismatch mask, or a focus irregularity mask. For the sake of brevity, pixel(s) lacking sufficient information that are determined to be part of the foreground in the reference image using the additional mask(s) can be referred to as additionally determined foreground pixels. Also, pixel(s) lacking sufficient information that are not determined as part of the foreground in the reference image using the additional mask(s) can be referred to as additionally determined background pixels. Furthermore, and in the context of this document, pixels lacking sufficient information in the reference and/or non-reference images can be referred to as "problematic pixels."

For one embodiment, the AFS logic/module 140 generates the additional mask(s) to identify any problematic pixels in the reference image that are encompassed by the contour band. Each problematic pixel may be due to one or more of the obstacles described above (e.g., highlight artifacts, color mismatches, focus irregularities, etc.) or other obstacles that affect pixel information. For a first example, a highlight mask is generated to include any problematic pixels in the reference image defined by the contour band that (i) have brightness values (i.e. lumas) larger than a brightness threshold; and (ii) are initially identified as initial foreground pixels. For a second example, a color mismatch mask is generated to include any problematic pixels in the reference image defined by the contour band that (i) have sufficiently different colors from their corresponding pixels in the non-reference image due to different exposures or white balances between the reference image and the non-reference image (i.e. the color difference between the problematic pixels in the reference image defined by the contour band and their corresponding pixels in the non-reference image is larger than a color difference threshold); and (ii) are initially identified as initial foreground pixels. For a third example, a focus irregularity mask is generated to include any problematic pixels in the reference image defined by the contour band that (i) are not identified as updated foreground pixels; and (ii) are initially identified as initial foreground pixels.

For one embodiment, the AFS logic/module 140 applies the additional mask(s) to refine the updated foreground mask by propagating foreground/background classification results from neighboring pixels associated with the updated foreground mask to problematic pixels caused by one or more of the obstacles described above. That is, for those problematic pixels in the reference image that lack sufficient information (e.g., sharpness values, intensity values, etc.), the foreground/background classification results defined by the updated foreground mask from their neighboring pixels may be used.

For one embodiment, the AFS logic/module 140 groups the problematic pixel(s) into one or more regions using, for example, thresholding or connected components analysis. Regions can include multiple pixels (e.g., one pixel neighborhood, multiple pixel neighborhoods, etc.). For example, and for one embodiment, when the AFS logic/module 140 detects problematic pixels in the reference image, the AFS logic/module 140 groups the problematic pixels into regions by examining whether the problematic pixels are direct neighbors or indirect neighbors with each other via other problematic pixels. Direct neighbors are immediately adjacent to each other. Indirect neighbors have at least one problematic pixel between them. For one embodiment, all problematic pixels that are direct or indirect neighbors are grouped into the same region.

Each region can be analyzed to determine whether the boundary pixels neighboring that region have mostly foreground boundary pixels or mostly background boundary pixels. For one embodiment, a region has mostly foreground boundary pixels when most of the pixels neighboring the region boundary are updated foreground pixels, as described above in connection with generating an updated foreground mask. For one embodiment, a region has mostly background boundary pixels when most of the pixels neighboring the region boundary are updated background pixels, as described above in connection with generating an updated foreground mask. For a first example, a region has mostly foreground boundary pixels when a first specified percentage of the pixels neighboring the region boundary are updated foreground pixels. For a second example, a region has mostly background pixels when a second specified percentage of the pixels neighboring the region boundary are updated background pixels. The percentage values can be empirically determined.

If a region has mostly foreground boundary pixels, then each problematic pixel in the region is classified as part of the foreground in the reference image and identified as one of the additionally determined foreground pixels. On the other hand, if a region has mostly background boundary pixels, then each problematic pixel in the region is classified as part of the background in the reference image and identified as one of the additionally determined background pixels (i.e., not identified as one of the additionally determined foreground pixels). For one embodiment, if a region has mostly background boundary pixels or if problematic pixels in the region are identified as additionally determined background pixels, the region is discarded or removed from consideration.

For one embodiment, the number of additional mask(s) generated and subsequently applied by the AFS logic/module 140 depends on the number of obstacles being resolved. For example, the AFS logic/module 140 performs the neighborhood propagation three times to apply three additional masks based on three obstacles, where the additional masks are as follows: (i) a highlight mask for resolving highlights artifacts, (ii) a color mismatch mask for resolving color mismatches; and (iii) a focus irregularity mask for resolving focus irregularities. It is to be appreciated that less than all three additional masks can be generated and/or applied. Before and/or after the generation and application of each of the additional mask(s), the AFS logic/module 140 can apply one or more noise filtering techniques to the updated information to remove one or more regions of resulting foreground pixels (including updated foreground pixels and additionally determined foreground pixels) in the reference image that are due to noise in the image.

After the additionally determined foreground pixel(s) are added to the updated foreground pixel(s) described above, the AFS logic/module 140 may generate the updated foreground mask. For one embodiment, the AFS logic/module 140 generates the updated foreground mask to: (i) mask the initial foreground pixel(s) without masking the initial background pixel(s); (ii) mask the included foreground contour pixel(s) defined by the contour band without masking the excluded background contour pixel(s) defined by the contour band; and (iii) mask the additionally determined foreground pixel(s) without masking the additionally determined background pixel(s).

For one embodiment, the AFS logic/module 140 applies the updated foreground mask to the reference image to distinguish the reference image's foreground from its background. The processing unit(s) 130 can also include a logic/module 150, which can receive the output of AFS logic/module 140 as input and use the received information for additional image processing and/or image generation. Additional image processing and/or image generation includes, but is not limited to, image editing, classification, pattern recognition, and feature extraction. In this way, the AFS techniques performed by the AFS logic/module 140 can assist with improving the functionality and operations of the system 100 used to synthesize or replicate effects on images. For one embodiment, the logic/module 150 is implemented as at least one of hardware (e.g., electronic circuitry of the processing unit(s) 130), software (e.g., one or more instructions of a computer program executed by the processing unit(s) 130), or a combination thereof. The logic/module 150 can be implemented in another system that differs from the system 100 (e.g., the logic/module 150 is implemented in processing unit(s) that are not part of the system 100, etc.).

The system 100 can include memory 160 for storing and/or retrieving image data 170 and/or metadata 180 associated with the image data 170. The image data 170 and/or the metadata 180 can be processed and/or captured by the other components of the system 100. Furthermore, other data (e.g., data captured by, processed by, and/or associated with at least one of processing unit(s) 130, peripheral(s) 190, and/or the imaging device 120, etc.) can be stored to and/or retrieved from the memory 160. The system 100 can also include a memory controller (not shown), which includes at least one electronic circuit that manages data flowing to and/or from the memory 160. The memory controller can be a separate processing unit or integrated as part of processing unit(s) 130. As explained above, one or more of the logic/modules 140 and 150 may be implemented as software (e.g., one or more instructions of a computer program executed by the processing unit(s) 130). For this embodiment, such software may be stored in the memory 160.

The system 100 can include an imaging device 120 that includes at least one of an imaging sensor, a lens assembly, or camera circuitry for capturing a sequence of images. For one embodiment, the imaging device 120 can include any known imaging component that enables image capture operations. For one embodiment, when the imaging device 120 includes a display device (e.g., a screen), the imaging device 120 can include a front-facing imaging device and/or a rear-facing imaging device. For this embodiment, the front-facing imaging device observes a scene in the same direction that the display device faces, while the rear-facing imaging device observes a scene in a direction that is different from the direction faced by the display device. Image sensor(s) of the device 120 can, for example, include a charge-coupled device (CCD) or complementary metal oxide semiconductor (CMOS) sensor. Imaging device 120 can also include an image signal processing (ISP) pipeline that is implemented as specialized hardware, software, or a combination of both. The ISP pipeline can perform one or more operations on raw images (also known as raw image files) received from image sensor(s) of the device 120. The ISP pipeline can also provide the processed image data to the memory 160, the optional peripheral(s) 190, and/or the processing unit(s) 130.

The system 100 can also include peripheral(s) 190. For one embodiment, the peripheral(s) 190 can include at least one of the following: (i) one or more input devices that interact with or send data to one or more components of the system 100 (e.g., mouse, keyboards, etc.); (ii) one or more output devices that provide output from one or more components of the system 100 (e.g., monitors, printers, display devices, etc.); or (iii) one or more storage devices that store data in addition to the memory 160. The peripheral(s) 190 may combine different devices into a single hardware component that can be used both as an input and output device (e.g., a touchscreen, etc.). The peripheral(s) 190 can also be referred to as input/output (I/O) devices 190 throughout this document. The system 100 can also include at least one peripheral control circuit (not shown), which can be a controller (e.g., a chip, an expansion card, or a stand-alone device, etc.) that interfaces with and is used to direct operation(s) of the peripheral(s) 190. The peripheral(s) controller can be a separate processing unit or integrated as one of the processing unit(s) 130.

The system 100 can include sensor(s) 191. For one embodiment, the sensor(s) 191 may include at least one sensor whose purpose is to detect a characteristic of one or more environs. For one embodiment, the sensor(s) 191 can be used to detect a position of the lens assembly in the imaging device 120 to enable determination of the first focus position, the second focus position, the first DOField, and/or the second DOField. Examples of such sensors include, but are not limited to, an accelerometer, a proximity sensor, a vibration sensor, a gyroscopic sensor, a voltage sensor, a current sensor, a resistance sensor, a refraction sensor, a reflection sensor, a rotation sensor, a velocity sensor, an inclinometer, and a momentum sensor.

For one embodiment, the system 100 includes a communication fabric 110. The communication fabric 110 can be a bus, a network, or a switch. When the fabric 110 is a bus, the fabric 110 is a communication system that transfers data between components of system 100, or between components of system 100 and other components of other systems (not shown). As a bus, the fabric 110 includes all related hardware components (wire, optical fiber, etc.) and/or software, including communication protocols. For one embodiment, the fabric 110 can include at least one of an internal bus or an external bus. Moreover, the fabric 110 can include at least one of a control bus, an address bus, or a data bus for communications associated with the system 100. For one embodiment, the fabric 110 can be a network or a switch. As a network, the fabric 110 may be any type of network such as a local area network (LAN), a wide area network (WAN) such as the Internet, a fiber network, a storage network, or a combination thereof, wired or wireless. When the fabric 110 is a network, the components of the system 100 do not have to be physically located next to each other. When the fabric 110 is a switch (e.g., a "cross-bar" switch), separate components of system 100 may be linked directly over a network even though these components may not be physically located next to each other. For example, at least two of the processing unit(s) 130, the communication fabric 110, the memory 160, the peripheral(s) 190, the imaging device 120, or the sensor(s) 191 are in distinct physical locations from each other and are communicatively coupled via the communication fabric 110, which is a network or a switch that directly links these components over a network.

For one embodiment, one or more components of the system 100 may be implemented as one or more integrated circuits (ICs). For example, at least one of the processing unit(s) 130, the communication fabric 110, the imaging device 120, the peripheral(s) 190, the sensor(s) 191, or the memory 160 can be implemented as a system-on-a-chip (SoC) IC, a three-dimensional (3D) IC, any other known IC, or any known combination of ICs. For another embodiment, two or more of components of the system 100 are implemented together as one or more ICs. For example, at least two of the processing unit(s) 130, the communication fabric 110, the memory 160, the peripheral(s) 190, the imaging device 120, or the sensor(s) 191 are implemented together as a single SoC IC.

Figure 1D:
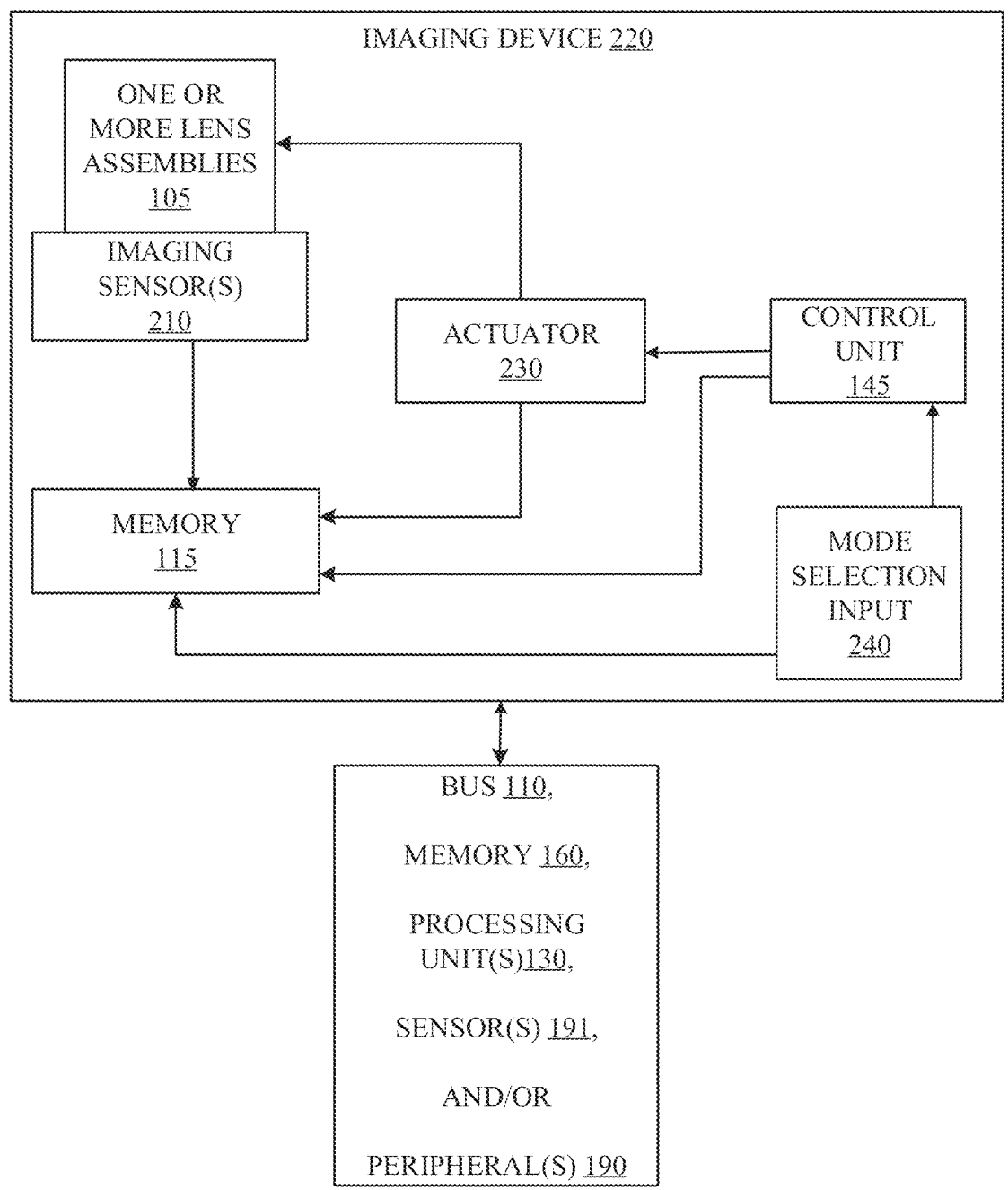
FIG. 1D illustrates, in block diagram form, an imaging device for performing an AFS technique according to one embodiment. The imaging device illustrated in FIG. 1D can be included in the processing system illustrated in FIG. 1A.

FIG. 1D is a block diagram of an imaging device 220 for performing an AFS technique according to one embodiment. The imaging device 220 illustrated in FIG. 1D can be included in the processing system 100 illustrated in FIG. 1A. For one embodiment, the imaging device 220 is similar to or the same as the imaging device 120 described above in connection with at least FIG. 1A. For one embodiment, the imaging device 220 communicates with the memory 160, the processing unit(s) 130, sensor(s) 191, and/or the peripheral(s) 190 via the bus 110, as described above in connection with at least FIG. 1A. These components are not described again in connection with at least FIG. 1D for brevity.

The imaging system 220 may be a camera system. The imaging system 220 may also be part of a multifunctional device, such as a mobile phone, tablet computer, personal digital assistant, portable music/video player, or any other electronic device that includes a camera system. The imaging system 220 may include one or more lens assemblies 105. For example, each lens assembly may include its own characteristics or physical imperfections that impact the quality of an image captured by the particular lens assembly. The one or more lens assemblies 105 may have similar characteristics or may have different characteristics (e.g., depth of field (DOField), depth of focus (DOFocus), aperture size, etc.). For one embodiment, the multiple lens assemblies 105 may be associated with different imaging sensors 210. Alternatively or additionally, two or more lens assemblies 105 may share one or more imaging sensors 210.

As depicted in FIG. 1D, the imaging device 220 may include one or more imaging sensors 210, which may detect and convey information indicative of a scene. For example, light may flow through one or more lens assemblies 105 before being detected by image sensor(s) 210 and stored in an appropriate data format in memory 115 or memory 160.

The imaging device 220 may also include an actuator 230, a control unit 145, and a mode select input 240. For one embodiment, the actuator 230 may manage control of one or more of the lens assemblies 105. For example, the actuator 230 may control focus positions and/or aperture sizes. It is to be appreciated that focus positions and/or aperture sizes can be variable or fixed. For one embodiment, the mode select input 240 may supply input to control unit 145 for controlling the actuator 230. Additionally or alternatively, input may be provided to control unit 145 for controlling the actuator 230. The input provided to the control unit 145 for controlling the actuator 230 can be provided from at least one of the memory 160, the processing unit(s) 130, sensor(s) 191, or the peripheral(s) 190. For one embodiment, the imaging device 220 uses charged coupled device(s) or complementary metal-oxide semiconductor(s) as the image sensor(s) 210. For one embodiment, the imaging device 220 uses an electro-mechanical unit (e.g., a voice coil motor, etc.) as the actuator 230. For one embodiment, some or all the data provided to or from each imaging sensor 210, the actuator 230, the control unit 145, the mode select input 240 is stored to or retrieved from the memory 115 or the memory 160.

The imaging device 220 can be used to capture the reference and non-reference images described above in connection with at least FIG. 1A, 1B, or 1C. For one embodiment, the control unit 145 and the actuator 230 can be used to place the imaging device 220 in an AFS mode, which enables capturing an AFS in accordance with the description provided above in connection with at least FIG. 1A, 1B, or 1C.

Figure 2A:
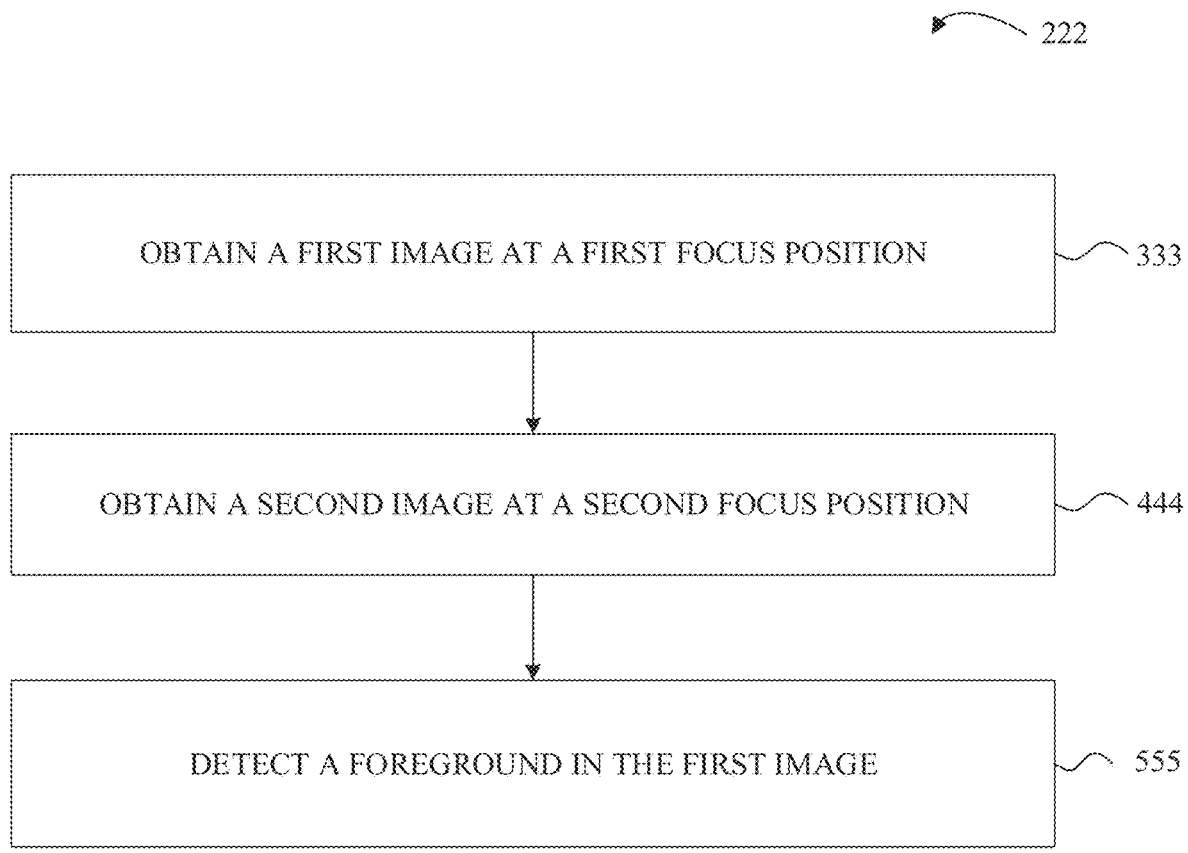
FIG. 2A is a flowchart representing an operation to capture an AFS according to an embodiment.

With regard now to FIG. 2A, which is a flowchart representing an operation 222 to capture an AFS according to an embodiment. Operation 222 can be performed by an AFS logic/module (e.g., the AFS logic/module 140 described above in connection with at least FIG. 1A, 1B, or 1C). Operation 222 begins at block 333, where an AFS logic/module performing operation 222 directs an imaging device to capture a first image representing a scene at a first focus position. The first focus position can be determined using an autofocus technique, as described above in connection with at least FIGS. 1A-1C. Furthermore, the first focus position can be associated with a first DOField such that an intended foreground of the scene represented in the first image is in focus, while other portions of the scene represented in the first image are not in focus. Alternatively, the first focus position can be associated with the first DOField such that the intended foreground of the scene represented in the first image is more in focus than other portions of the scene represented in the first image (e.g., the intended background of the scene, etc.). The imaging device can, for example, be the imaging device 120 described above in connection with at least FIG. 1A, the imaging device 220 described above in connection with at least FIG. 1D, or any other imaging device capable of performing autofocus techniques.

At block 444, an AFS logic/module performing operation 222 can direct an imaging device to capture a second image representing the scene at a second focus position that is determined based on the first focus position and/or the first DOField. For one embodiment, the second focus position is associated with a second DOField. The second focus position is at least two DOFields away from the first focus position. For one embodiment, the second image is captured based on the first image such that the intended foreground of the scene represented in the second image is not in focus, while other portions of the scene represented in the second image are in focus (e.g., the intended background of the scene, etc.). For another embodiment, the second image is captured based on the first image such that the intended foreground of the scene represented in the second image is not in focus, while other portions of the scene represented in the second image are more in focus than the intended foreground (e.g., the intended background of the scene, etc.). Operation 222 proceeds to block 555, where an AFS module/logic performing operation 222 detects a foreground of the scene based on information acquired from the first and second images. For one embodiment, each of blocks 333, 444, and 555 in operation 222 are performed in accordance with one or more of the descriptions provided above in connection with at least FIGS. 1A-1C or as described below in connection with at least FIGS. 2B-3B.

Figure 2B:
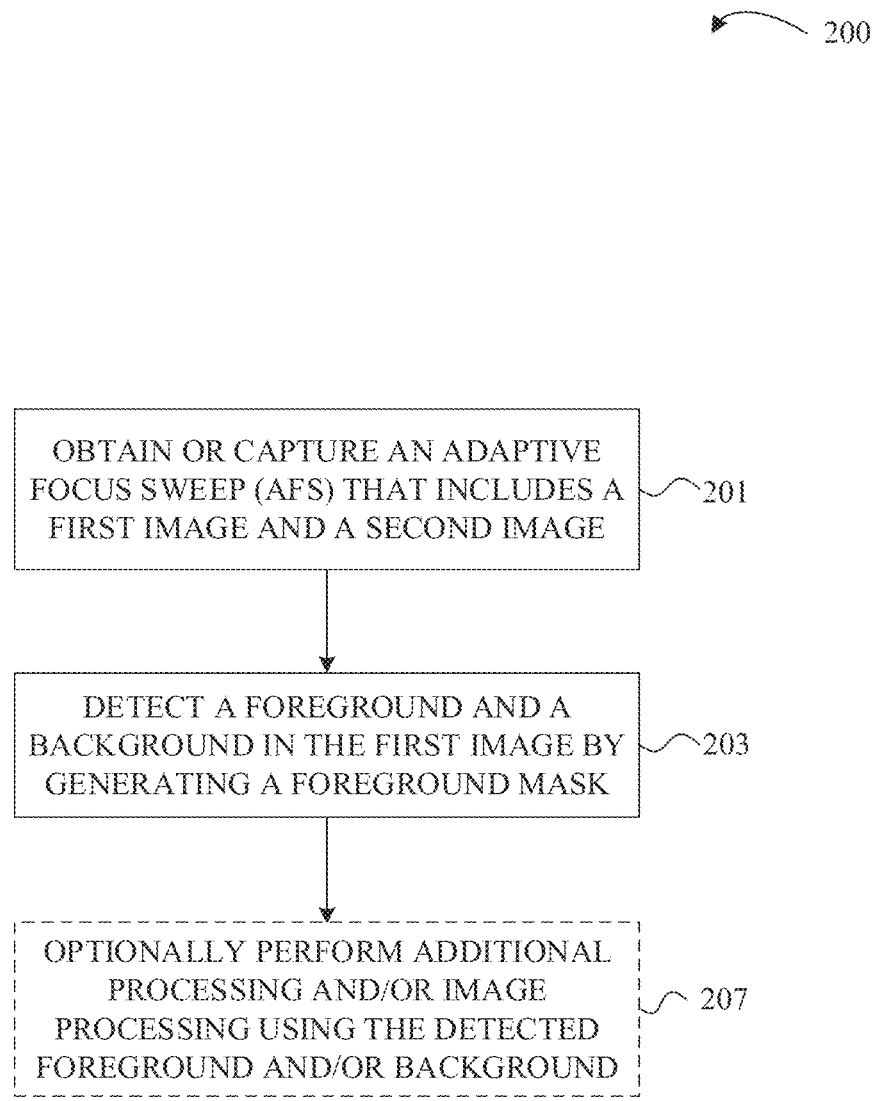
FIG. 2B is a flowchart representing an operation to perform an AFS technique according to an embodiment.

Referring now to FIG. 2B, which is a flowchart representing one embodiment of an adaptive focus sweep (AFS) operation 200. Operation 200 is an example of how a captured AFS can be used to distinguish a foreground of a scene in an image from a background of the scene in the image. Capturing an AFS is described above in connection with at least FIGS. 1A-2A. Operation 200 can be performed by an AFS logic/module (e.g., the AFS logic/module 140 described above in connection with at least FIG. 1A, 1B, or 1C). Operation 200 begins at block 201, where an AFS is obtained from memory or captured by an imaging device. The AFS can be obtained from memory (e.g., memory 160 described above in connection with at least FIG. 1A, 1B, or 1C, memory 115 described above in connection with at least FIG. 1D, etc.). Additionally, or alternatively, the AFS can be received from an imaging device that captures the AFS (e.g., as described above in connection with at least FIGS. 1A-2A, etc.). For one embodiment, an AFS logic/module performing operation 200 directs an imaging device to capture the AFS as described above in connection with at least FIGS. 1A-2A.

For one embodiment, the AFS comprises the following: (i) a first image captured at a first focus position (e.g., the reference image captured at the reference focus position as described above in connection with at least FIG. 1A, etc.); and (ii) a second image (e.g., the non-reference image captured at the non-reference focus position as described above in connection with at least FIG. 1A, etc.). For one embodiment, block 201 is performed according to one or more descriptions provided above in connection with at least FIGS. 1A-2A.

Operation 200 proceeds to block 203, where foreground and background regions of the scene represented in the first image are detected by generating a foreground mask using information acquired from the AFS. Operation 200 proceeds to optional block 207, where at least one of the foreground or background is used for additional image processing and/or image generation. For example, the foreground and background can be used to generate a composite image that has its background artificially blurred and/or its foreground artificially sharpened to replicate a desired shallow depth of field (sDOField) effect. For one embodiment, blocks 203 and 207 are performed according to one or more descriptions provided above in connection with at least FIGS. 1A-2A.

Figure 2C:
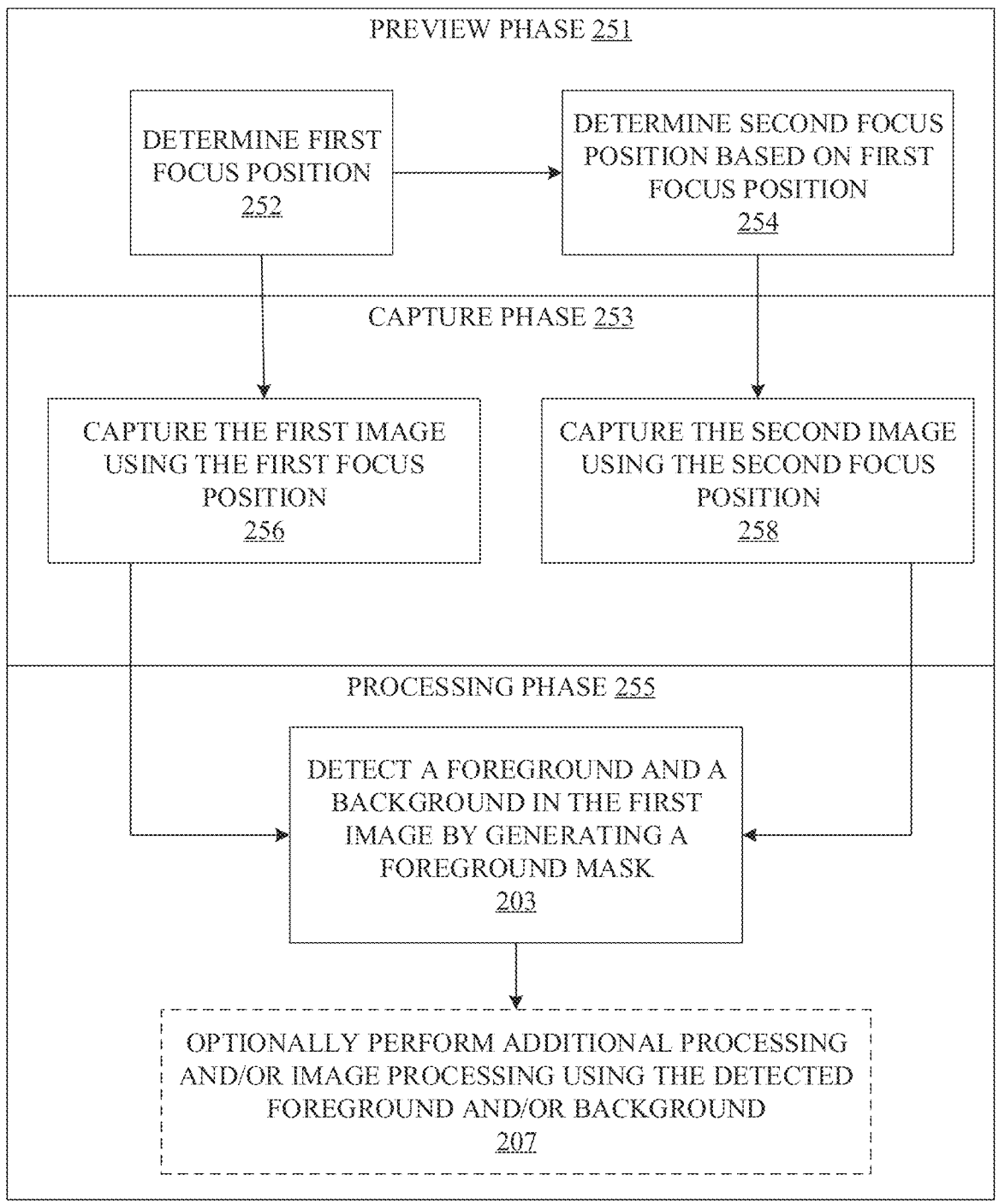
FIG. 2C illustrates, in flowchart form, an operation to perform an AFS technique according to an embodiment.

With regard now to FIG. 2C, which illustrates a flowchart of one embodiment of an operation 250 to perform an AFS technique. Operation 250 can be performed by an AFS logic/module (e.g., the AFS logic/module 140 described above in connection with at least FIG. 1A). Operation 250 can be similar to or the same as operation 200 described above in connection with at least FIG. 2B. For the sake of brevity, only the differences between operation 250 and operation 200 are described below in connection with at least FIG. 2C.

As shown in FIG. 2C, one difference between operation 250 and operation 200 is that operation 250 includes three phases—a preview phase 251, a capture phase 253, and a processing phase 255. For one embodiment, output from the preview phase 251 is input to capture phase 253, and output from the capture phase 253 is input to the processing phase 255. For one embodiment, the operations performed in block 201 include the preview phase 251 and the capture phase 253. Block 201 is described above in connection FIG. 2B.

The preview phase 251 can be a preview mode in an imaging device. For example, and for one embodiment, the preview phase 251 is a live preview mode that enables an autofocus technique through contrast detection that includes mapping one or more pixels in an image to one or more corresponding values that each represent a degree of focus of the pixels. During the preview phase 251, at block 252, a first focus position (e.g., the reference focus position described above in connection with at least FIG. 1A) is determined. The first focus position can be determined using an autofocus technique as described above in connection with at least FIGS. 1A-2B or as described below in connection with at least FIGS. 3A-3B. During the preview phase 251, at block 254, a second focus position (e.g., the non-reference focus position described above in connection with at least FIG. 1A) is determined. The second focus position can be determined based on the first focus position (e.g., the second focus position can be determined as being at least two DOFields away from the first focus position, etc.). For one embodiment, the second focus position is determined as described above in connection with at least FIGS. 1A-2B or as described below in connection with at least FIGS. 3A-3B.

The capture phase 253 can be a capture mode in an imaging device that enables acquisition of images. During the capture phase 253, at block 256, a first image (e.g., the reference image described above in connection with at least FIG. 1A) is captured using the first focus position. The first image can have an intended foreground of a scene in focus, while other portions of the scene represented in the first image are not in focus (e.g., the intended background of the scene, etc.). Alternatively, the first image can have the intended foreground of the scene more in focus than other portions of the scene (e.g., the intended background of the scene, etc.). During the capture phase 253, at block 258, a second image (e.g., the non-reference image described above in connection with at least FIG. 1A) is captured using the second focus position. The second image can have an intended background that is more in focus than the intended foreground. Alternatively, the second image can have an intended background that is in focus, while the intended foreground is out of focus. For one embodiment, capturing the first and second images is performed according to one or more descriptions provided above in connection with at least FIGS. 1A-2B or as described below in connection with at least FIGS. 3A-3B.

The processing phase 255 can be a processing mode, where information from the preview phase 251 and capture phase 253 are provided to processing unit(s) (e.g., processing unit(s) 130 described in connection with at least FIG. 1A). Each of the blocks 203 and 207 illustrated in FIG. 2C are similar to or the same as the blocks 203 and 207 illustrated in FIG. 2B. For the sake of brevity, these blocks are not described again.

Figure 3A:
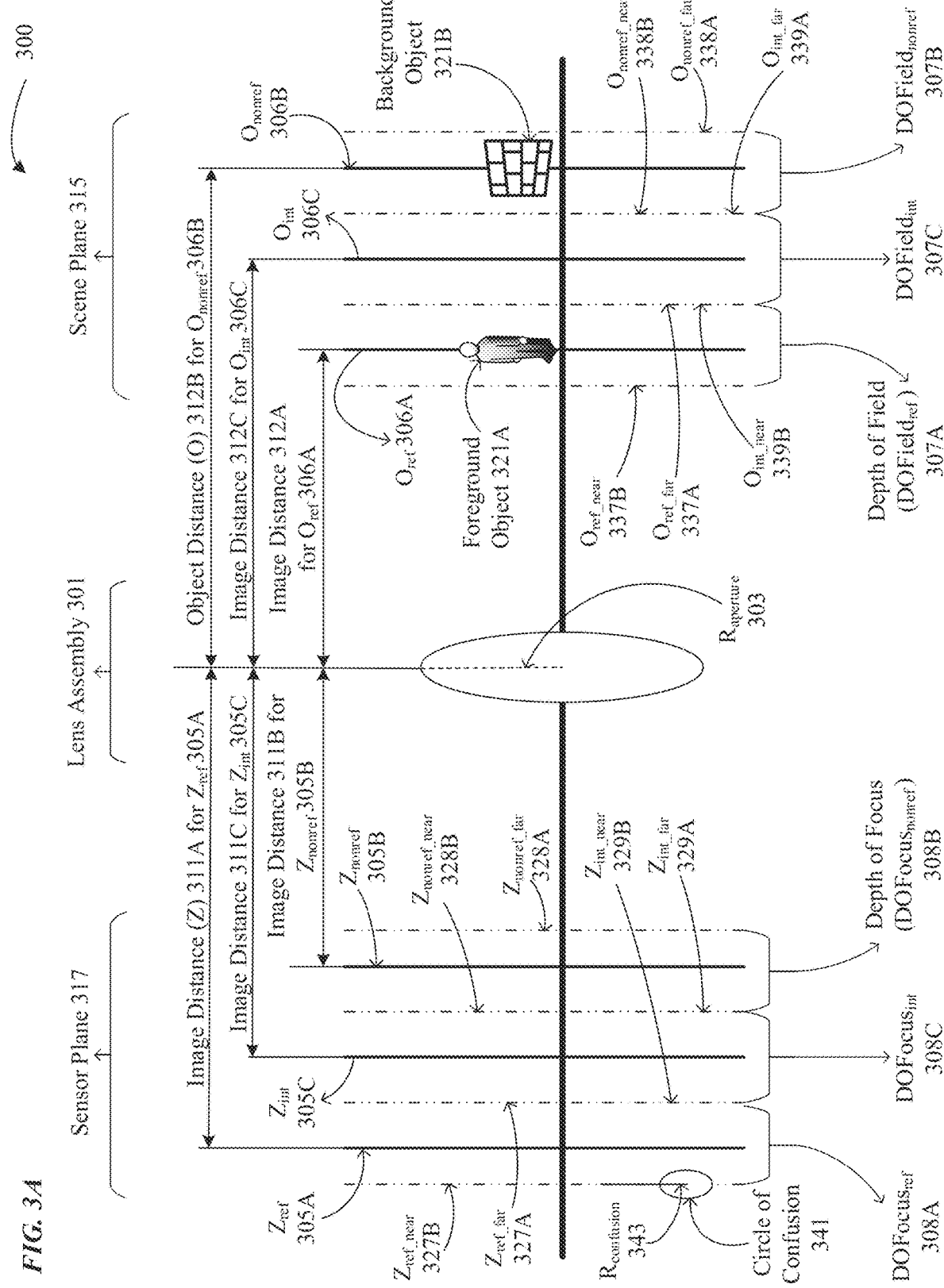
FIG. 3A illustrates, in schematic form, an operation to determine a non-reference focus position based on a reference focus position according to an embodiment of an AFS technique.

FIG. 3A illustrates, in schematic form, an operation 300 of determining a non-reference focus position 305B based on a reference focus position 305A according to an embodiment of an AFS technique. Illustrated in FIG. 3A is a scene region 315 that contains a foreground object 321A and a background object 321B. When the scene plane 315 is viewed through the lens 301, an image that includes representation of the objects 321A-B is projected through the lens 301 onto the sensor plane 317 (also known as a film plane), which is the region of an imaging sensor where image data is captured.

As shown in FIG. 3A, the sensor region 317 represents possible positions at which the image sensor may be positioned relative to the lens assembly 301. For example, this region may include three focus positions 305A-C—(i) a reference focus position 305A (also referred to as $Z_{ref}$ 305A or first focus position 305A); (ii) a non-reference focus position 305B (also referred to as $Z_{nonref}$ 305B or second focus position 305B); and (iii) an intermediate focus position 305C (also referred to as $Z_{int}$ 305C or third focus position 305C).

Also, and as explained above, a specific focus position (e.g., any one of the focus positions 305A-C) is associated with a corresponding object position, a corresponding DOFocus, and a corresponding DOField. Thus, and as shown in FIG. 3A, the reference focus position 305A is associated with a corresponding reference object position 306A ($O_{ref}$ 306A), a corresponding reference DOField (DOField$_{ref}$ 307A), and a corresponding reference DOFocus (DOFocus$_{ref}$ 308A); the non-reference focus position 305B is associated with a corresponding non-reference object position 306B ($O_{nonref}$ 306B), a corresponding non-reference DOField (DOField$_{nonref}$ 307B), and a corresponding non-reference DOFocus (DOFocus$_{nonref}$ 308B); and the intermediate focus position 305C is associated with a corresponding intermediate object position 306C ($O_{int}$ 306C), a corresponding intermediate DOField (DOField$_{int}$ 307C), and a corresponding intermediate DOFocus (DOFocus$_{int}$ 308C).

For one embodiment, a first image (e.g., the reference image described above in connection with at least FIG. 1A) that includes the objects 321A-B is captured at the reference focus position 305A. For one embodiment, a second image (e.g., the non-reference image described above in connection with at least FIG. 1A) that includes the objects 321A-B is captured at the non-reference focus position 305B. While an intermediate reference position is discussed here, it should be appreciated that the imaging system need not capture an image at the intermediate focus position 305C during the methods described here. Also, there may be more than one intermediate focus position 305C.

The imaging system may be configured to provide for relative movement between the lens assembly 301 and the sensor plane 317 to achieve a desired focus position (which in turn may achieve the respective object position and DOField associated with that focus position). As mentioned above, each focus position is associated with an image distance (Z) between the lens assembly 301 and the sensor plane 317. As depicted in FIG. 3A, the non-reference focus position 305B, reference focus position 305A, and intermediate focus position 305C may be associated with image distance 311B, image distance 311A, and image distance 311C, respectively. Similarly, the non-reference object position 306B, reference object position 306A, and intermediate object position 306C may be associated with object distance (O) 312B, object distance 312A, and object distance 312C, respectively.

As shown in FIG. 3A, each of the image distances (Z) 311A-C corresponds to a respective one of the object distances (O) 312A-C. More specifically, Z 311A has a relationship with O 312A; Z 311B has a relationship with O 312B; and Z 311C has a relationship with O 312C. The relationship between each of the object distances (O) 312A-C and a respective one of the image distances (Z) 311A-C in FIG. 3A can be expressed as follows:

$$(1/f)=[(1/Z)+(1/O)],$$

where f is an effective focal length of the lens assembly 301;
where Z is one of the image distances 311A-C; and
where O is one of the object distances 312A-C that corresponds to a respective one of the image distances 311A-C.

It is to be appreciated that not all of the object distances (O) or the image distances (Z) in FIG. 3A are labelled. The image distances (Z) for each of the following focus positions shown in FIG. 3A are not labelled: $Z_{ref\_near}$ 327B, the $Z_{ref\_far}$ 327A, $Z_{int\_near}$ 329B, $Z_{int\_far}$ 329A, $Z_{nonref\_near}$ 328B, and $Z_{nonref\_far}$ 328A. The object distances (O) for each of the following object positions shown in FIG. 3A are not labelled: $O_{ref\_near}$ 337B, the $O_{ref\_far}$ 337A, $O_{int\_near}$ 339B, $O_{int\_far}$ 339A, $O_{nonref\_near}$ 338B, and $O_{nonref\_far}$ 338A. It is also to be appreciated that the immediately preceding paragraph applies to these unlabelled object distances (O) and the image distances (Z).

The reference focus position $Z_{ref}$ 305A can be determined using an autofocus technique, such as discussed above. For one embodiment, the first image (i.e., the reference image) that includes the objects 321A-B is captured using the reference focus position $Z_{ref}$ 305A. This first image includes the foreground object 321A in focus and some or all of the background object 321B out of focus. For one example, the foreground object 321A in the first image is in focus and the background object 321B in the first image is not in focus. For another example, the foreground object 321A in the first image is more in focus than the background object 321B in the first image.

For one embodiment, the non-reference focus position $Z_{nonref}$ 305B can be determined based on the reference focus position $Z_{ref}$ 305A. For one embodiment, a second image (i.e., the non-reference image) that includes the objects 321A-B is captured using the non-reference focus position 305B. This second image includes some or all of the background object 321B being more in focus than the foreground object 321A. For one example, the background object 321B in the second image is more in focus than the foreground object 321A in the second image. For another example, the background object 321B in the second image is in focus and the foreground object 321A in the second image is not in focus. Thus, the sharpness of the foreground object 321A will be higher in the first image (i.e., the reference image) captured using the reference focus position $Z_{ref}$ 305A than in the second image (i.e., the non-reference image) captured using the non-reference focus position $Z_{nonref}$ 305B. Furthermore, the sharpness of some or all of the background object 321B will be higher in the non-reference image captured using the non-reference focus position $Z_{nonref}$ 305B than in the reference image captured using the reference focus position $Z_{ref}$ 305A.

Determining the non-reference focus position 305B used to capture the non-reference image includes determining a reference depth of field (DOField$_{ref}$) 307A associated with the reference focus position 305A. For one embodiment, the process of determining the DOField$_{ref}$ 307A includes two operations: (i) determining a reference depth of focus (DOFocus$_{ref}$) 308A that corresponds to the reference focus position $Z_{ref}$ 305A; and (ii) deriving the DOField$_{ref}$ 307A from the determined DOFocus$_{ref}$ 308A. As shown in FIG. 3A, the DOFocus$_{ref}$ 308A associated with the reference focus position 305A ranges from a far reference focus position ($Z_{ref\_far}$) 327A to a near reference focus position ($Z_{ref\_near}$) 327B. For one embodiment, the far reference focus position ($Z_{ref\_far}$) 327A is calculated as follows:

$$Z_{ref\_far}=Z_{ref}\times[1-(R_{confusion}\div R_{aperture})],$$

where $Z_{ref}$ is the reference focus position 305A,
where $R_{confusion}$ is the radius 343 of the circle of confusion 341,
where $R_{aperture}$ is the radius 303 of the lens aperture associated with the lens assembly 301, and
where $Z_{ref\_far}$ is the far reference focus position 327A.

For one embodiment, the near reference focus position ($Z_{ref\_near}$) 327B is calculated as follows:

$$Z_{ref\_near}=Z_{ref}\times[1+(R_{confusion}\div R_{aperture})],$$

where $Z_{ref}$ is the reference focus position 305A,
where $R_{confusion}$ is the radius 343 of the circle of confusion 341,
where $R_{aperture}$ is the radius 303 of the lens aperture associated with the lens assembly 301, and
where $Z_{ref\_near}$ is the near reference focus position 327B.

The DOField$_{ref}$ 307A can then be derived as follows: (i) determining the corresponding far reference object position ($O_{ref\_far}$) 337A from the far reference focus position ($Z_{ref\_far}$) 327A (which can be derived based on one or more relationships between the image distances and the object distances shown in FIG. 3A or assumed to be known as explained above); and (ii) determining the corresponding near reference object position ($O_{ref\_near}$) 337B from the near reference focus position ($Z_{ref\_near}$) 327B (which can be derived based on one or more relationships between the image distances and the object distances shown in FIG. 3A or assumed to be known as explained above). The DOField$_{ref}$ 307A associated with the reference focus position 305A ranges from the far reference object position ($O_{ref\_far}$) 337A to the near reference focus position ($O_{ref\_near}$) 337B. If desired, the reference object position ($O_{ref}$) 306A can be determined from the reference focus position ($Z_{ref}$) 305A.

FIG. 3A includes an exemplary circle of confusion 341 with a radius ($R_{confusion}$ 343) that is associated with the reference focus position 305A. As used here, a "circle of confusion" and its variations refer to a variable blur spot that is indistinguishable from a point being viewed through a lens. A maximum permissible circle of confusion refers to the largest blur spot that is a point being viewed through a lens. A lens can precisely focus objects at only one distance. As a result, objects at other distances are defocused. Defocused object points are imaged as blur spots rather than points. Consequently, the circle of confusion determines a range of object positions as measured from a lens assembly to a scene plane in the 3D world over which an object appears acceptably sharp. This range of object positions is the depth of field (DOField), as described above. Techniques for determining the maximum permissible circle of confusion are known so they are not described in detail throughout this document.

For one embodiment, the $R_{confusion}$ 343 associated with the circle of confusion 341 is the maximum acceptable blur radius for a single pixel in an image, which may be ascertained using known techniques of acquiring this information. For one embodiment, it is assumed that the circle of confusion 341 and the $R_{confusion}$ 343 are known.

For one embodiment, the radius of the lens aperture ($R_{aperture}$) 303 associated with the lens assembly 301 is ascertained using known techniques of acquiring this type of information. For one embodiment, it is assumed that the $R_{aperture}$ 303 is known or provided. $R_{aperture}$ 303 may have a fixed size or a variable size.

For one embodiment, the non-reference focus position 305B is associated with a non-reference DOField$_{nonref}$ 307B that is at least two DOFields away from the reference DOField$_{ref}$ 307A associated with the reference focus position 305A. That is, there is always at least one intermediate DOField$_{int}$ 307C between the reference DOField$_{ref}$ 307A and the non-reference DOField$_{nonref}$ 307B. For example, and as shown in FIG. 3A, the non-reference focus position 305B is exactly two DOFocus away from the reference focus position 305A. In this embodiment, the intermediate DOField$_{int}$ 307C may border both the DOField$_{ref}$ 307A and the DOField$_{nonref}$ 307B. It should be appreciated that there may be additional separation between the intermediate DOField 307C and one or both of the reference DOField 307A and the non-reference DOField 307B. To achieve the positioning of the intermediate DOField$_{int}$ 307C between the reference DOField$_{ref}$ 307A and the non-reference DOField$_{nonref}$ 307B, a non-reference focus position ($Z_{nonref}$) 305B may be selected such that there is an intermediate focus position ($Z_{int}$) 305C, where the DOFocus$_{int}$ 308C of the intermediate focus position 305C is positioned between the DOFocus$_{ref}$ 308A for the reference focus position ($Z_{ref}$) 305A and the DOFocus$_{nonref}$ 308B for the non-reference focus position 305B, as will be discussed in more detail below.

Other embodiments, however, are not so limited. For a first example, and for one embodiment, the non-reference focus position 305B can be set as the infinity focus position (that is, a position at which the lens 301 forms an image of the object 321A by focusing at an infinite distance away). For a second example, and for one embodiment, the non-reference focus position 305B can be set as the hyperfocal focus position (that is, a position at which the lens 301 forms an image of the object 321A by focusing at the hyperfocal distance away). The hyperfocal focus position is generally based on the hyperfocal distance, which is a distance beyond which all objects can be brought into an acceptable focus. The hyperfocal distance is entirely dependent upon what sharpness level is considered to be acceptable and can be specified based on the radius ($R_{confusion}$) 343 associated with the circle of confusion 341, the radius of the lens aperture ($R_{aperture}$) 303, and/or the effective focal length of the lens assembly 301.

For one embodiment, determining the non-reference focus position ($Z_{nonref}$) 305B that is exactly two DOFocus away from the reference focus position ($Z_{ref}$) 305A includes two operations: (i) determining an intermediate depth of focus (DOFocus$_{int}$) 308C that corresponds to an intermediate focus position (Inn) 305C; and (ii) deriving the non-reference focus position ($Z_{nonref}$) 305B from the determined DOFocus$_{int}$ 308C. As shown in FIG. 3A, the DOFocus$_{int}$ 308C associated with the intermediate focus position 305C ranges from a near intermediate focus position ($Z_{int\_near}$) and a far intermediate focus position ($Z_{int\_far}$). We design the DOFocus$_{int}$ 308C such that the near intermediate focus position ($Z_{int\_near}$) is located at the far reference focus position ($Z_{ref\_far}$) 327A associated with DOFocus$_{ref}$ 308A and the far intermediate focus position ($Z_{int\_far}$) is located at the near non-reference focus position ($Z_{nonref}$ 328B associated with DOFocus$_{nonref}$ 308B. For near) one embodiment, the near intermediate focus position ($Z_{int\_near}$), i.e. the far reference focus position ($Z_{ref\_far}$) 327A is calculated as follows:

$$Z_{int\_near}=Z_{ref\_far}=Z_{ref}\times[1-(R_{confusion}\div R_{aperture})],$$

where $Z_{int\_near}$ is the near intermediate focus position,
where $Z_{nonref\_near}$ is the near non-reference focus position 328B,
where $Z_{ref}$ is the reference focus position 305A,
where $R_{confusion}$ is the radius 343 of the circle of confusion 341, and
where $R_{aperture}$ is the radius 303 of the lens aperture associated with the lens assembly 301.

For one embodiment, the far intermediate focus position ($Z_{int\_far}$), i.e. the near non-reference focus position ($Z_{nonref\_near}$) 328B, is calculated as follows:

$$Z_{int\_far} = Z_{nonref\_near} = Z_{int\_near} \times [1-(R_{confusion} \div R_{aperture})] \div [1+(R_{confusion} \div R_{aperture})],$$

where $Z_{int\_far}$ is the far intermediate focus position,
where $Z_{nonref\_near}$ is the near non-reference focus position 328B,
where $Z_{int\_near}$ is the near intermediate focus position,
where $R_{confusion}$ is the radius 343 of the circle of confusion 341, and
where $R_{aperture}$ is the radius 303 of the lens aperture associated with the lens assembly 301.

For one embodiment, the non-reference focus position ($Z_{nonref}$) 305B is calculated as follows:

$$Z_{nonref} = Z_{nonref\_near} \div [1+(R_{confusion} \div R_{aperture})],$$

where $Z_{nonref}$ is the non-reference focus position 305B,
where $Z_{nonref\_near}$ is the near non-reference focus position 328B,
where $R_{confusion}$ is the radius 343 of the circle of confusion 341, and
where $R_{aperture}$ is the radius 303 of the lens aperture associated with the lens assembly 301.

The $DOField_{nonref}$ 307B can then be derived as followed: (i) determining the corresponding far non-reference object position ($O_{nonref\_far}$) 338A from the far non-reference focus position ($Z_{nonref\_far}$) 328A (which can be derived based on one or more relationships between the image distances and the object distances shown in FIG. 3A or assumed to be known as explained above); and (ii) determining the corresponding near non-reference object position ($O_{non\_near}$) 338B from the near non-reference focus position ($Z_{nonref\_near}$) 328B (which can be derived based on one or more relationships between the image distances and the object distances shown in FIG. 3A or assumed to be known as explained above). The $DOField_{nonref}$ 307B associated with the non-reference focus position 305B ranges from the far non-reference object position ($O_{nonref\_far}$) 338A to the near non-reference object position ($O_{nonref\_near}$) 338B. If desired, the non-reference object position ($O_{nonref}$) 306B can be determined from the non-reference focus position ($Z_{nonref}$) 305B.

For another embodiment, the non-reference focus position 305B that is exactly two DOFocus away from the reference focus position 305A is calculated directly as follows:

$$Z_{nonref} = Z_{ref} \times [1-(R_{confusion} \div R_{aperture})]^2 \div [1+(R_{confusion} \div R_{aperture})]^2,$$

where $Z_{nonref}$ is the non-reference focus position 305B,
where $Z_{ref}$ is the reference focus position 305A,
where $R_{confusion}$ is the radius 343 for the circle of confusion 341 that is associated with the reference focus position 305A, and
where $R_{aperture}$ is the radius 303 of the lens aperture for the lens assembly 301.

For yet another embodiment, the non-reference focus position 305B can be determined based on a Digital Analog Converter (DAC) value associated with the reference focus position 305A. A DAC value is indicative of a voltage level and/or a current level supplied to components associated with an imaging device (e.g., an actuator, other mechanical devices, etc.) for moving the lens associated with the imaging device (e.g., the lens 301, etc.) and/or the imaging sensor associated with the imaging device (e.g., the sensor 317, etc.). DAC values have been normalized, so voltage levels and/or current levels associated with different imaging devices can adhere to a notionally common scale. In some imaging devices, the physical distance between the sensor plane (e.g., sensor plane 317) and the optical center of a lens (e.g., lens 301) is linearly proportional to the DAC values. Consequently, this linear relationship can be calibrated in advance and used to determine a DAC value of the non-reference focus position 305B based on the DAC value of the reference focus position 305A. For example, and for one embodiment, a non-reference focus position 305B that is exactly two DOFocus away from the reference focus position 305A is calculated as follows:

$$DAC_{nonref} = k \times DAC_{ref} + b \times (k-1) \div a,$$

where $DAC_{nonref}$ is a DAC value corresponding to the non-reference focus position 305B,
where $DAC_{ref}$ is a DAC value corresponding to the reference focus position 305A,
where $k = [1-(R_{confusion} \div R_{aperture})]^2 \div [1+(R_{confusion} \div R_{aperture})]^2$,
where a and b are calibrated constants defining the linear relationship between a focus position Z and its corresponding DAC value.

In FIG. 3A, the depths of focus 308A-C border each other. That is, one boundary of the $DOFocus_{int}$ 308C borders one boundary of the $DOFocus_{ref}$ 308A and another boundary of the $DOFocus_{int}$ 308C borders one boundary of the $DOFocus_{nonref}$ 308B. Other embodiments, however, are not so limited. For example, there may be separation between the boundaries of each of the $DOFocus_{ref}$ 308A, the $DOFocus_{nonref}$ 308B, and the $DOFocus_{int}$ 308C. The boundaries of the $DOField_{ref}$ 307A, the $DOField_{nonref}$ 307B, and the $DOField_{int}$ 307C may also border each other or there may be separation between them.

In instances where a system (e.g., a system performing any one of the techniques described above in connection with FIGS. 1A-3A, etc.) has one or more additional depth/disparity sensing capabilities (e.g., a stereo camera system (which in some instances may also include the camera that takes the reference and non-reference image discussed herein) or a depth sensing camera such as a structured light or time-of-flight sensor), this additional depth information may be used in calculating the number of intermediate depths of focus (e.g., one or more $DOFocus_{int}$ 308C, etc.) between the reference depth of focus (e.g., $DOFocus_{ref}$ 308A, etc.) and the non-reference depth of focus (e.g., one or more $DOFocus_{non\_ref}$ 308B, etc.). For one embodiment, the additional depth information may be captured and determined prior to capturing one or more of the reference and non-reference images, and thus may be separate from depth information determined from comparing the reference and non-reference images as described herein throughout. It should be appreciated that in some instances the additional depth information may have lower spatial resolution than the depth information that may be calculated from the reference and non-reference images, which may allow for the overall system to quickly approximate depth information in the scene.

In some instances, the additional depth sensing information may provide information about the relative depths across the scene (or portions thereof). In some instances, the additional depth information may be used to determine or otherwise approximate whether the image has distinguishable foreground and background components using one or more predetermined criteria, and the relative distance between the foreground and background components. As an example, the additional depth information may comprise a histogram of the distribution of depth values within the scene, which may be evaluated to look for foreground and background components. In some instances, the system may look for peaks in the histogram meeting one or more predetermined criteria (e.g., one or more of a maximum value, peak width or the like) to identify foreground and background components. In some instances, the system may not be able to distinguish between foreground and background given the predetermined criteria (or the foreground and background components are below a low distances threshold). In some of these instances, when this occurs, the system may forego capturing the reference and non-reference images. Additionally or alternatively, when the system identifies both a foreground and background component from the additional depth information, and when the distance between the foreground and background of the scene to be captured meets or exceeds the threshold distance, the system may select a number of intermediate depths of focus (e.g., one or more DOFocus$_{int}$ 308C, etc.) based on a magnitude of the distance between the foreground and background of the scene to be captured (starting with a minimum value of 1 intermediate depths of focus for a predetermined magnitude, and then increasing to higher levels such as 1.25, 1.5, 2, 3, etc. as the magnitude increases further).

Figure 3B:
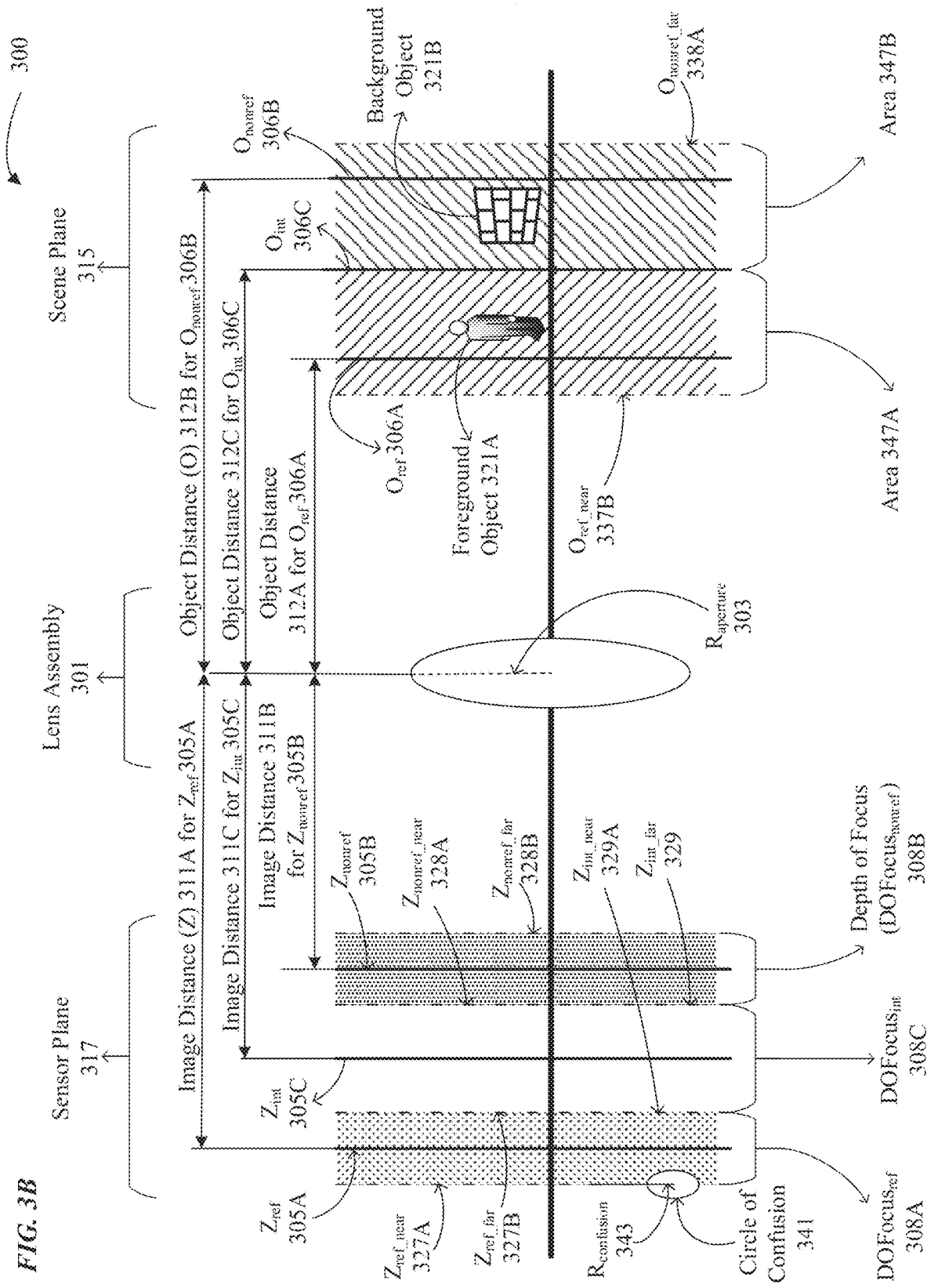
FIG. 3B illustrates, in schematic form, an operation to determine a non-reference focus position based on a reference focus position according to an embodiment of an AFS technique.

With regard now to FIG. 3B, which provides additional details about operation 300 described above in connection with FIG. 3A. For brevity, only the differences between FIGS. 3A and 3B are described below in connection with FIG. 3B.

As explained above, one or more processors implementing operation 300 select a reference focus position ($Z_{ref}$) 305A using an autofocus technique, and then use information associated with the reference focus position ($Z_{ref}$) 305A to select a non-reference focus position ($Z_{nonref}$) 305B. This is achieved by using the DOField$_{ref}$ 307A (which corresponds to the reference focus position ($Z_{ref}$) 305A), the DOField$_{nonref}$ 307B (which corresponds to the non-reference focus position ($Z_{nonref}$) 305B), and the DOField$_{int}$ 307C (which corresponds to an intermediate focus position ($Z_{int}$) 305C). Consequently, the DOField$_{ref}$ 307A, the DOField$_{nonref}$ 307B, and the DOField$_{int}$ 307C do not overlap for the three focus positions $Z_{ref}$ 305A, $Z_{nonref}$ 305B, and $Z_{int}$ 305C.

Due to this lack of overlap, the reference image captured using the reference focus position ($Z_{ref}$) 305A will have objects in the reference DOField 307A (e.g., the foreground object 321A) in focus and objects in the non-reference DOField 307B (e.g., some or all of the background object 321B) that are more out of focus than the objects in the reference DOField 307A, while the non-reference image captured using the non-reference focus position ($Z_{nonref}$) 305B will have objects in the reference DOField 307A (e.g., the foreground object 321A) more out of focus than objects in the non-reference DOField 307B (e.g., some or all of the background object 321B).

By having at least one intermediate DOField (e.g., DOField$_{int}$ 307C, etc.) between the reference DOField (e.g., DOField$_{ref}$ 307A, etc.) and the non-reference DOField (e.g., DOField$_{nonref}$ 307B, etc.), small shifts in the focus position from the intended focus position (e.g., focus position 305A, focus position 305B, etc.) should not cause an object position (e.g., object position 306A, object position 306B, etc.) to be in focus in both the reference and non-reference images. In practice, there may be some inaccuracies in achieving a given focus position. For example, when the reference focus position 305A is selected to have a corresponding reference object position 306A in focus, an image captured at any focus position within the reference DOFocus 308A will have the reference object position 306A in focus, but the DOField of that image may deviate from the intended reference DOField 307A. This may cause object distances outside of the intended reference DOField to be in focus. For example, as shown in FIG. 3B, region 347A represents the collective range of depth of fields for focus positions within the reference DOFocus 308A, and thus it is possible for any object distances in area 347A to be in focus depending on where the image sensor is positioned within the DOFocus 308A. Similarly, region 347B represents the collective range of depth of fields for focus positions within the non-reference DOFocus 308B, and it is possible for any object distances in area 347B to be in focus depending on where the image sensor is positioned within the non-reference DOFocus 308B.

However, by having at least one intermediate DOFocus (e.g., DOFocus$_{int}$ 308C, etc.) between the reference DOFocus (e.g., DOFocus$_{ref}$ 308A, etc.) and the non-reference DOFocus (e.g., DOFocus$_{nonref}$ 308B, etc.), the areas 347A and 347B will not overlap. In this way, so long as the reference image is captured at a focus position within the reference DOFocus and the non-reference image is captured within the non-reference DOFocus, the depth of fields of the reference image and the non-reference image will not overlap, and thus there would not be any object distances that are in focus in both images. Accordingly, providing at least an intermediate DOFocus between the reference DOFocus and the non-reference DOFocus may help protect against inaccuracies in positioning the imaging system at a given focus position. It should be appreciated that when this specification discusses capturing an image at a given focus position (e.g., a reference focus position, a non-reference focus position, etc.), the imaging system is using that focus position as a target to which it is attempting to position the lens and image plane.

Figure 4A:
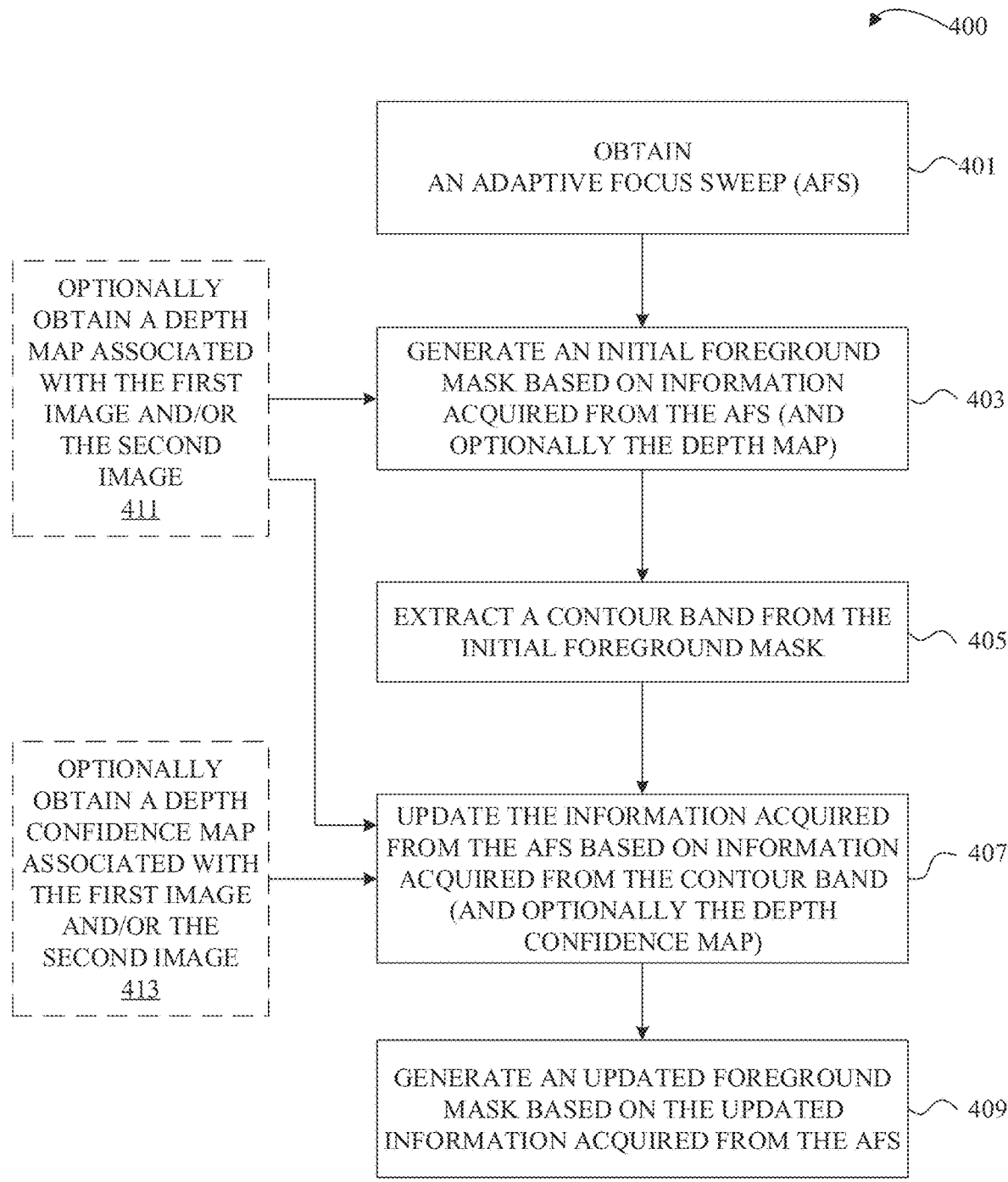
FIG. 4A is a flowchart representing an operation to generate a foreground mask according to one embodiment.

Referring now to FIG. 4A, which is a flowchart representing one embodiment of an operation 400 to generate a foreground mask in accordance with one embodiment. Operation 400 can be performed by an AFS logic/module (e.g., the logic/module 140 described above in connection with at least FIG. 1A). Operation 400 begins at block 401, where an adaptive focus sweep (AFS) is captured or obtained as described above in connection with one or more of FIGS. 1A-3B. The AFS can include a first image (e.g., the reference image described above in connection with one or more of FIGS. 1A-3B) and a second image (e.g., the non-reference image described above in connection with one or more of FIGS. 1A-3B).

Operation 400 proceeds to block 403, where an initial foreground mask is generated based on information acquired from the AFS. The initial foreground mask is generated to mask one or more initial foreground pixels in the first image. At optional block 411, a depth map associated with the first image and/or the second image can be obtained and included in the information used to generate the initial foreground mask. Generating an initial mask using acquired depth information is described above in connection with at least FIG. 1A. For one embodiment, block 401, block 403, and optional block 411 are performed according to one or more descriptions provided above in connection with at least FIG. 1A. For one embodiment, the initial foreground mask is generated to mask the initial foreground pixel(s) in the first image (i.e., the reference image) without masking one or more initial background pixels in the first image (i.e., the reference image). These initial background pixel(s) can be designated as any pixel(s) in the first image that are not identified as the initial foreground pixel(s).

Referring again to FIG. 4A, operation 400 proceeds to block 405. At block 405, a contour band is extracted from the initial foreground mask. This extraction can be according to one or more descriptions provided above in connection with at least FIG. 1A. At block 407, and for one embodiment, information acquired from the contour band (e.g., the foreground contour confidence values, the background contour confidence values, etc.) is used to update the information acquired from the AFS (i.e., the information associated with the initial foreground mask). At optional block 413, a depth confidence map can be obtained and included in the information used to update the information acquired from the AFS (i.e., the information associated with the initial foreground mask). Furthermore, at block 409, an updated foreground mask is generated based on the updated information acquired from the AFS (i.e., the information associated with the initial foreground mask and the updates to that information that are based on the contour band). For one embodiment, block 407, block 409, and optional block 413 are performed according to one or more descriptions provided above in connection with at least FIG. 1A.

Figure 4B:
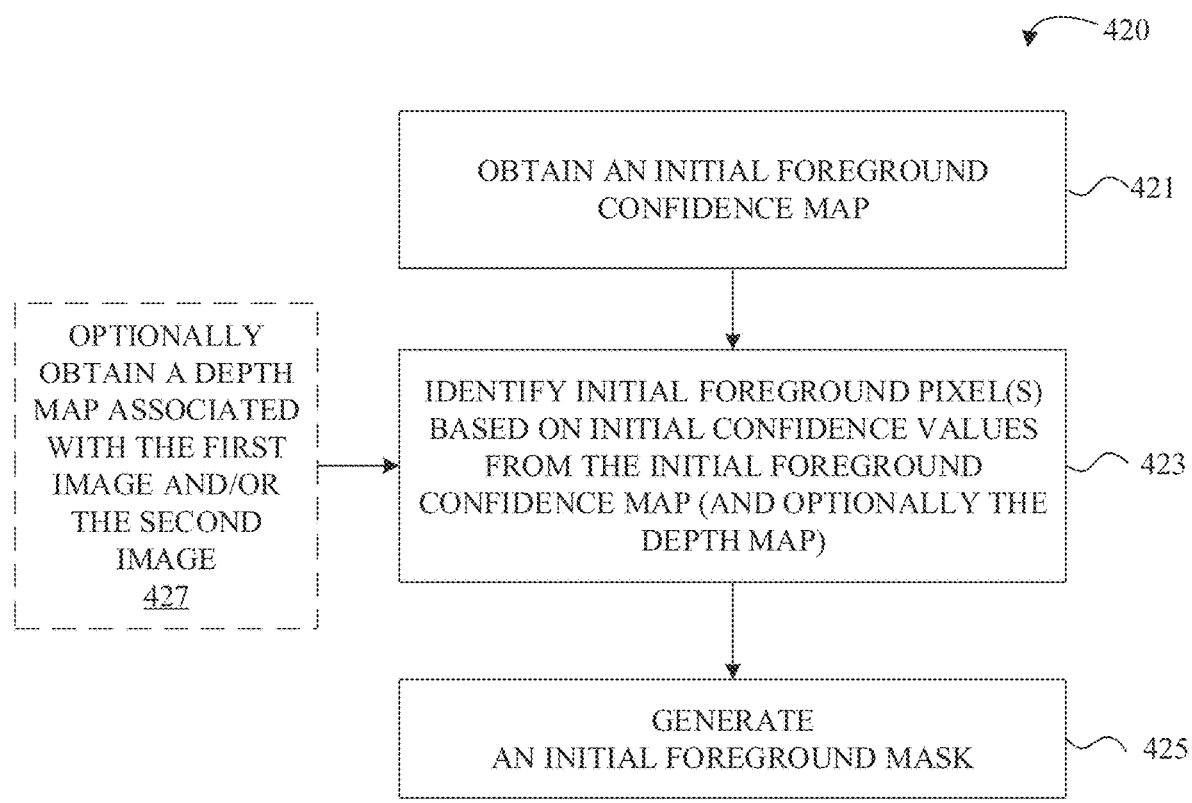
FIG. 4B is a flowchart representing an operation to generate an initial foreground mask according to one embodiment.

FIG. 4B is a flowchart representing an operation 420 to generate an initial foreground mask according to one embodiment. Operation 420 provides an example of block 403 of operation 400, which is described above in connection with at least FIG. 4A. Operation 420 also provides an example of block 503 of operation 500, which is described below in connection with at least FIG. 5A. Operation 420 can be performed by an AFS logic/module (e.g., the logic/module 140 described above in connection with at least FIG. 1A).

Operation 420 begins at block 421, where an AFS logic/module performing operation 420 obtains an initial foreground confidence map. For one embodiment, the initial foreground confidence map is generated by an AFS logic/module performing operation 420 in accordance with descriptions provided below in connection with at least FIG. 4C. At block 423, an AFS logic/module performing operation 420 identifies initial foreground pixel(s) in the reference image as pixel(s) having initial confidence values that are equal to or greater than a confidence threshold. Initial background pixels may also be identified in the reference image as pixel(s) having initial confidence values that are less than the confidence threshold. For one embodiment, this identification is performed as described above in connection with at least FIG. 1A. At optional block 427, an AFS logic/module performing operation 420 can identify the initial foreground pixel(s) using the initial foreground confidence map and an optional depth map. Block 427 can be performed as described above in connection with at least FIG. 1A. Next, process 420 proceeds to block 425. At this block, an initial foreground mask is generated to mask the initial foreground pixel(s) in the reference image. That is, an AFS logic/module performing operation 420 generates an initial foreground mask to mask the initial foreground pixel(s) in the reference image without masking the initial background pixel(s). Generating the initial foreground mask can be performed as described above in connection with at least FIG. 1A.

Figure 4C:
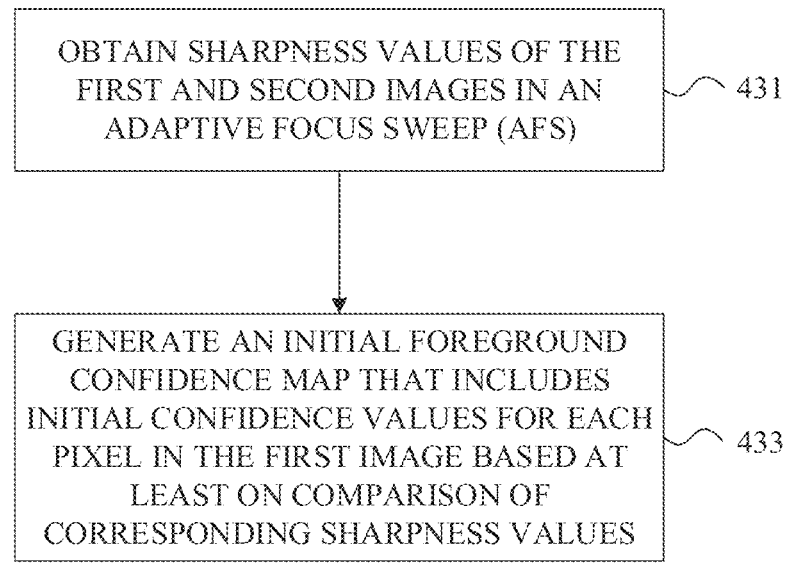
FIG. 4C is a flowchart representing an operation to generate an initial foreground confidence map according to one embodiment.

Referring now to FIG. 4C, which is a flowchart representing an operation 430 to generate an initial foreground confidence map according to one embodiment. Operation 430 provides an example of block 421 of operation 420, which is described above in connection with at least FIG. 4B. Operation 430 can be performed by an AFS logic/module (e.g., the logic/module 140 described above in connection with at least FIG. 1A). Operation 430 begins at block 431, where an AFS logic/module performing operation 430 obtains sharpness values associated with corresponding pixels of the first and second images in an AFS. As described above in connection with at least FIG. 1A, the sharpness for a pixel can be that specific pixel's gradient or an overall sharpness value for a given pixel neighborhood associated with that specific pixel. For one embodiment, and as described above in connection with at least FIG. 1A, the overall sharpness value for a given pixel neighborhood can be a weighted combination of individual pixels' gradients. For one embodiment, a pixel's sharpness is computed in accordance with at least one of the descriptions provided above in connection with at least FIG. 1A. At block 433, an AFS logic/module performing operation 430 generates an initial foreground confidence map that includes initial confidence values for each pixel in the first image based on at least a comparison of corresponding sharpness values in the first and second images. Examples of techniques for generating an initial foreground confidence map can be found in the description provided above in connection with at least FIG. 1A (e.g., the exemplary pseudo-code, etc.).

Figure 4D:
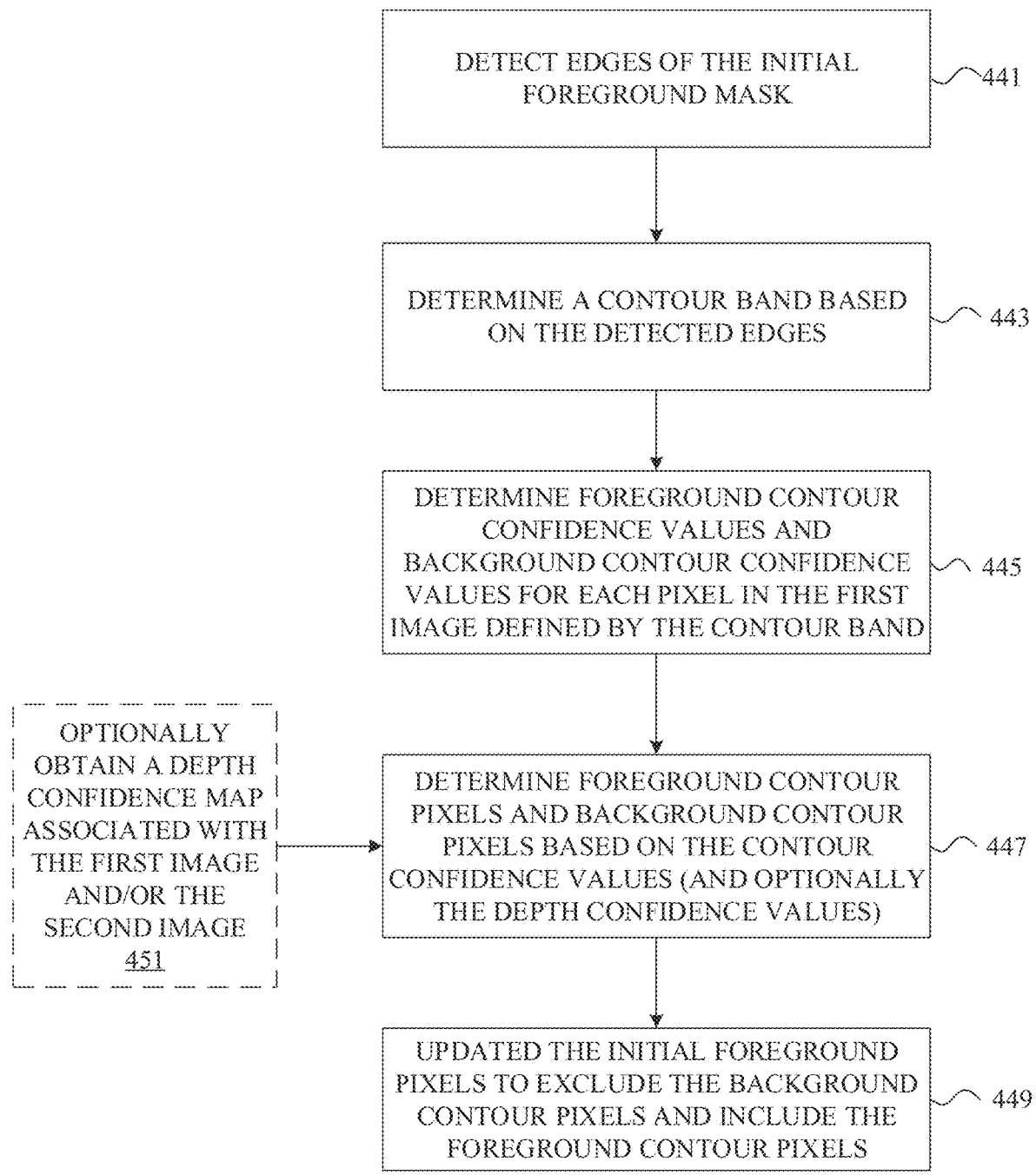
FIG. 4D is a flowchart representing an operation to update information acquired from an AFS based on information acquired by a contour band according to one embodiment.

FIG. 4D is a flowchart representing an operation 440 to update information acquired from an AFS based on information acquired by a contour band according to one embodiment. Operation 440 provides an example of block 407 of operation 400, which is described above in connection with at least FIG. 4A. Operation 440 also provides an example of block 507 of operation 500, which is described below in connection with at least FIG. 5A. Operation 440 can be performed by an AFS logic/module (e.g., the logic/module 140 described above in connection with at least FIG. 1A). Operation 440 begins at block 441, where an AFS logic/module performing operation 440 detects edges of the initial foreground mask as described above in connection with at least FIG. 1A. Next, at block 443, an AFS logic/module performing operation 440 determines a contour band based on the detected edges, as described above in connection with at least FIG. 1A.

At block 445, an AFS logic/module performing operation 440 determines foreground contour confidence values and background contour confidence values in accordance with the description provided in connection with at least FIG. 1A. For one embodiment, an AFS logic/module performing operation 440 determines the foreground contour confidence values and the background contour confidence values by applying a bilateral filter or a variant of a bilateral filter during determination of the sharpness of each pixel in the reference image. For one embodiment, an AFS logic/module performing operation 440 determines the foreground contour confidence values and the background contour confidence values using the relevant pseudo-code described above in connection with at least FIG. 1A. Next, at block 447, an AFS logic/module performing operation 440 determines foreground contour pixels and background contour pixels. Each of these contour pixels are described above in connection with at least FIG. 1A. For one embodiment, an AFS logic/module performing operation 440 can, at optional block 451, obtain one or more optional depth confidence maps. The optional depth maps can be used for determining the foreground contour pixels and background contour pixels. Use of the optional depth confidence maps is described above in connection with at least FIG. 1A. Operation 440 proceeds to block 449, where an AFS logic/module performing operation 440 updates the initial foreground pixels to exclude the background contour pixels and to include the foreground contour pixels. In this way, an updated foreground mask can be generated to: (i) mask initial foreground pixels without masking the initial background pixels; and (ii) mask the foreground contour pixels without masking the background contour pixels.

Figure 5A:
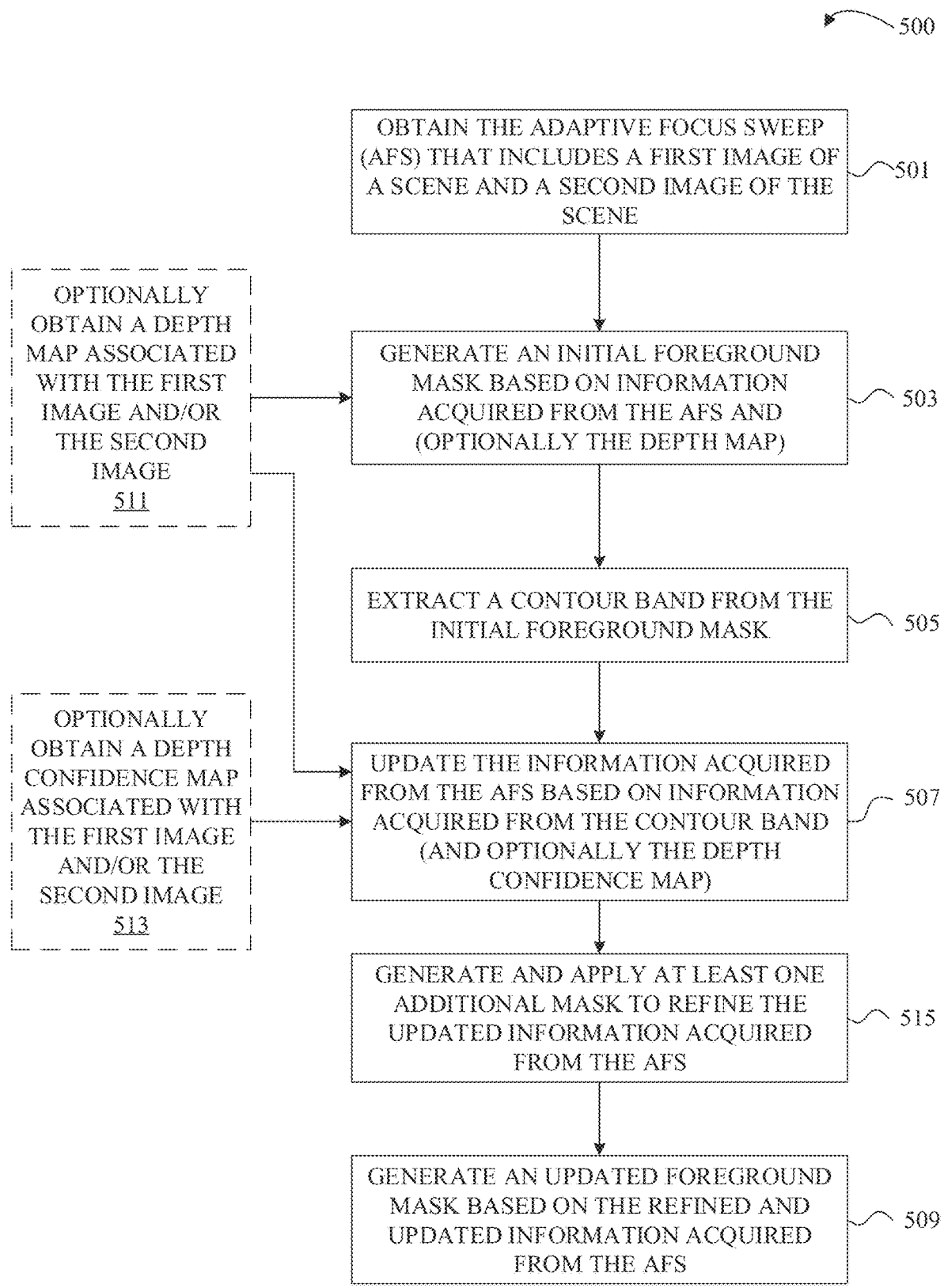
FIG. 5A is a flowchart representing an operation to generate a foreground mask according to another embodiment.

FIG. 5A is a flowchart representing one embodiment of an operation 500 to generate a foreground mask in accordance with one embodiment. Operation 500 can be performed by an AFS logic/module (e.g., the logic/module 140 described above in connection with at least FIG. 1A). Operation 500 of FIG. 5A is similar to or the same as operation 400 of FIG. 4A, which is described above. Specifically, blocks 501, 503, 505, 507, 511, and 513 of operation 500 are similar to or the same as blocks 401, 403, 405, 407, 411, and 413 of operation 400. For the sake of brevity, only the differences between operation 500 and operation 400 are described below in connection with at least FIG. 5A.

Two differences between operation 500 and operation 400 are found in blocks 515 and 509. With regard to block 515, one or more additional masks can be generated and applied to pixel(s) in the first image (i.e., the reference image). The one or more additional masks can be used to determine that one or more pixels in the first image that have incomplete or no information are part of the foreground in the first image in addition to the updated foreground pixel(s) associated with the updated foreground mask. For one embodiment, the one or more additional masks includes at least one of a highlight mask, a color mismatch mask, or a focus irregularity mask. For one embodiment, block 515 is performed according to one or more descriptions provided below in connection with at least FIG. 5B.

At block 509, an updated foreground mask is generated based on the following: (i) the information associated with the initial foreground mask; (ii) the updates to that information associated with the additional mask(s). For one embodiment, block 509 is performed according to one or more descriptions provided above in connection with at least FIG. 1A.

Figure 5B:
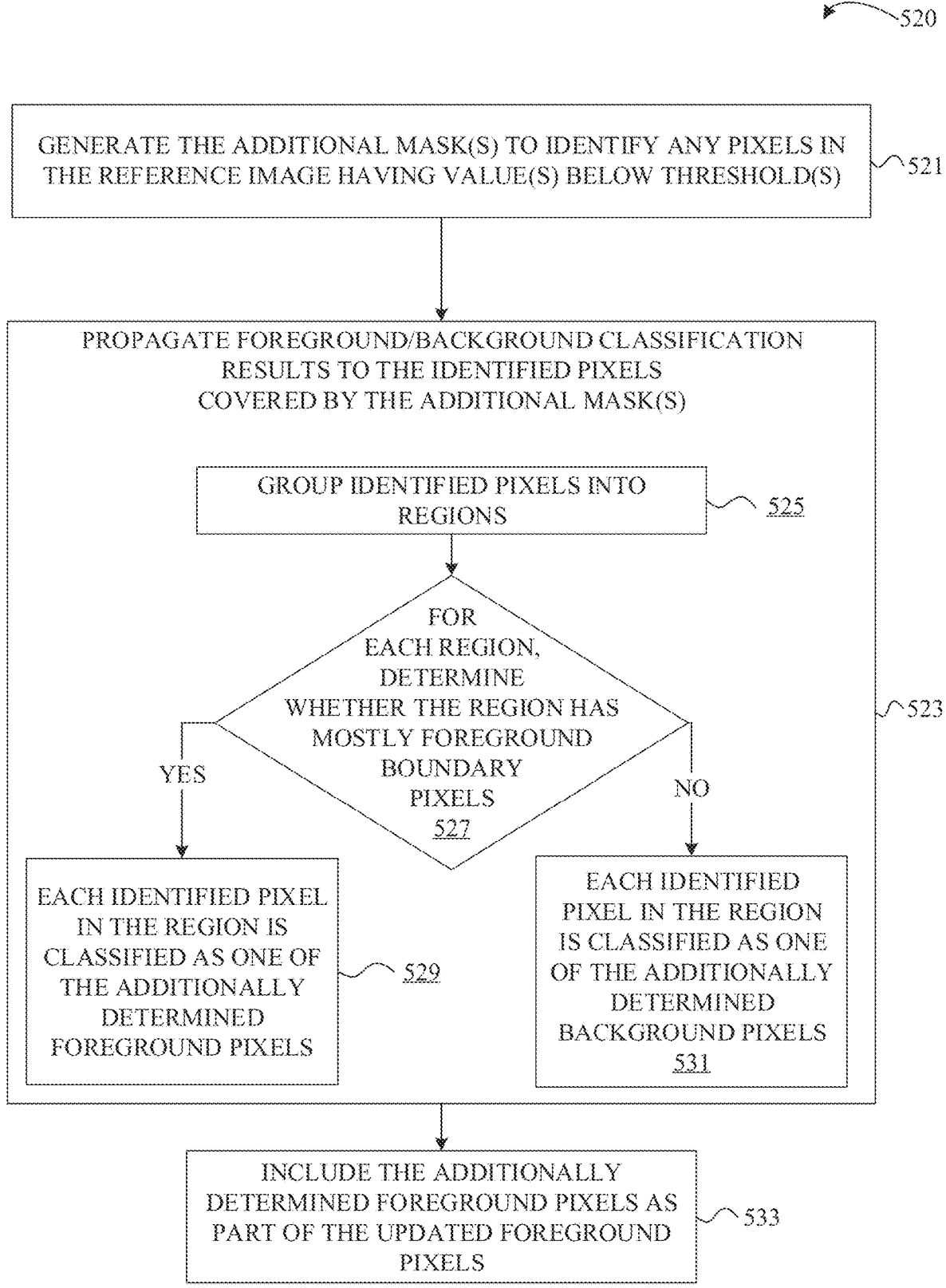
FIG. 5B is a flowchart representing an operation to generate and apply at least one additional mask to refine updated information acquired from an AFS according to an embodiment.

FIG. 5B is a flowchart representing an operation 520 to generate and apply at least one additional mask to refine updated information acquired from an AFS according to an embodiment. For one embodiment, operation 520 provides additional details about block 515 described above in connection with at least FIG. 5A. Operation 520 can be performed by an AFS logic/module (e.g., the logic/module 140 described above in connection with at least FIG. 1A). Operation 520 begins at block 521, where an AFS logic/module performing operation 520 generates at least one additional mask to identify one or more problematic pixels in the reference image defined by the contour band that can be included as part of the foreground in the reference image. For one embodiment, the additional mask(s) select those problematic pixels that (i) lack information due to obstacles such as highlight artifacts, color mismatches, and/or focus irregularities; and (ii) are initially identified as initial foreground pixels (associated with the initial foreground mask). Block 521 can be performed as described above in connection with at least FIG. 1A.

Next, operation 520 proceeds to block 523. At this block, an AFS logic/module performing operation 520 applies the additional mask(s) by propagating foreground/background classification results to problematic pixels in the reference image from neighboring pixels in the reference image that are associated with the updated foreground mask. Propagating foreground/background classification results can be performed in accordance with descriptions provided above in connection with at least FIG. 1A. Block 523 includes four blocks 525, 527, 529, and 531. With regard to block 525, an AFS logic/module performing operation 520 groups the problematic pixels into regions. For one embodiment, grouping the problematic pixels into regions is performed in accordance with the description provided above in connection with at least FIG. 1A. At decision 527, an AFS logic/module performing operation 520 analyzes each region to determine whether the boundary pixels neighboring that region include mostly foreground boundary pixels or mostly background boundary pixels. For one embodiment, a region is deemed to have mostly foreground boundary pixels when most of the pixels neighboring the region boundary are foreground pixels. For one embodiment, a region is deemed to have mostly background boundary pixels when most of the pixels neighboring the region boundary are background pixels. At block 529, when a region has mostly foreground boundary pixels, then each problematic pixel in that region is included as one of the additionally determined foreground pixels. At block 531, when a region does not have mostly foreground boundary pixels (i.e., the regions has mostly background boundary pixels), then all pixels in the regions are removed from consideration. That is, all of the region's pixels are additionally determined background pixels. For one embodiment, each of blocks 525, 527, 529, and 531 is performed in accordance with the description provided above in connection with at least FIG. 1A. At block 533, an AFS logic/module performing operation 520 includes the additionally determined foreground pixels as part of the updated foreground pixels covered by the updated foreground mask. Block 533 can be performed in accordance with the description provided above in connection with at least FIG. 1A.

Figure 6:
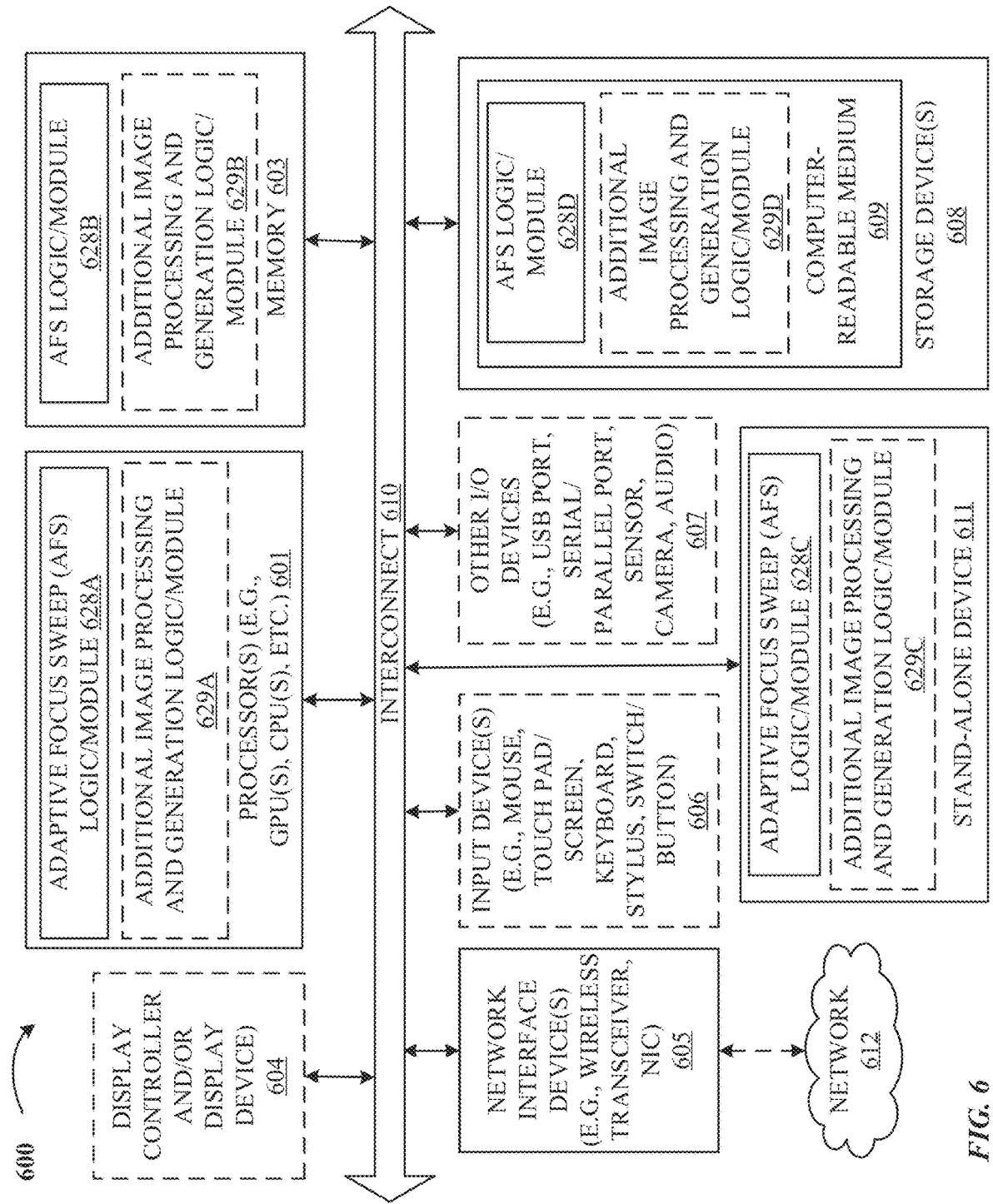
FIG. 6 illustrates an exemplary processing system for capturing an AFS and/or performing an AFS technique according to one or more embodiments described herein.

FIG. 6 is a block diagram illustrating an example of a data processing system 600 that may be used with one embodiment. For example, the system 600 may represent any of the data processing systems described above performing any of the processes or methods described above in connection with one or more of FIGS. 1A-5B.

System 600 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 600 is intended to show a high-level view of many components of the computer system. Nevertheless, it is to be understood that additional components may be present in certain implementations and furthermore, different arrangement of the components shown may occur in other implementations. System 600 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute at least one set of instructions to perform any of the methodologies discussed herein.

For one embodiment, system 600 includes processor(s) 601, memory 603, devices 605-608, and device 611 coupled to each other via a bus or an interconnect 610. The components of system 600 shown in dashed boxes are optional, but some embodiments may require them. Processor(s) 601 may represent a single processor or multiple processors with a single processor core or multiple processor cores included therein. Processor(s) 601 may represent one or more general-purpose processors such as a microprocessor, a central processing unit (CPU), graphics processing unit (GPU), or the like. More particularly, processor(s) 601 may be a complex instruction set computing (CISC) microprocessor, reduced instruction set computing (RISC) microprocessor, very long instruction word (VLIW) microprocessor, processor implementing other instruction sets, or processor implementing a combination of instruction sets. Processor(s) 601 may also be one or more special-purpose processors such as an application specific integrated circuit (ASIC), an application-specific instruction set processor (ASIP), a cellular or baseband processor, a field programmable gate array (FPGA), a digital signal processor (DSP), a physics processing unit (PPU), an image processor, an audio processor, a network processor, a graphics processor, a graphics processing unit (GPU), a network processor, a communications processor, a cryptographic processor, a co-processor, an embedded processor, a floating-point unit (FPU), or any other type of logic capable of processing instructions.

Processor(s) 601, which may be a low power multi-core processor socket such as an ultra-low voltage processor, may act as a main processing unit and central hub for communication with the various components of the system 600. Such processor(s) can be implemented as one or more system-on-chip (SoC) integrated circuits (ICs). At least one of an adaptive focus sweep (AFS) logic/module 628A or an optional logic/module 629A (which can use the output of the AFS logic/module 628A for additional image processing and/or generation) may reside, completely or at least partially, within processor(s) 601. Additional image processing and/or generation includes, but is not limited to, image editing, classification, pattern recognition, and feature extraction.

For one embodiment, at least one of the AFS logic/module 628A or the optional logic/module 629A residing in the processor(s) 601 enables the processor(s) 601 to perform any or all of the operations or methods described above in connection with one or more of FIGS. 1A-5B. Additionally or alternatively, the processor(s) 601 may be configured to execute instructions for performing the operations and methodologies discussed herein.

System 600 may further include a graphics interface that communicates with optional graphics subsystem 604, which may include a display controller, a graphics processing unit (GPU), and/or a display device. Processor(s) 601 may communicate with memory 603, which in one embodiment can be implemented via multiple memory devices to provide for a given amount of system memory. Memory 603 may include one or more volatile storage (or memory) devices such as random access memory (RAM), dynamic RAM (DRAM), synchronous DRAM (SDRAM), static RAM (SRAM), or other types of storage devices. Memory 603 may store information including sequences of instructions that are executed by processor(s) 601 or any other device. For example, executable code and/or data from a variety of operating systems, device drivers, firmware (e.g., input output basic system or BIOS), and/or applications can be loaded in memory 603 and executed by processor(s) 601. An operating system can be any kind of operating system.

For one embodiment, the memory 603 includes at least one of an AFS logic/module 628B or an optional logic/module 629B (which can use the output of the AFS logic/module 628B for additional image processing and/or generation) as executable instructions. Additional image processing and/or generation includes, but is not limited to, image editing, classification, pattern recognition, and feature extraction. For one embodiment, when the instructions represented by at least one of the AFS logic/module 628B or the optional logic/module 629B are executed by the processor(s) 601, the instructions cause the processor(s) 601 to perform any, all, or some of the processes or methods described above in connection with one or more of FIGS. 1A-5B.

System 600 may further include I/O devices such as devices 605-608, including network interface device(s) 605, input device(s) 606, other I/O device(s) 607, and storage device(s) 608. Network interface device 605 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 606 may include a mouse, a touch pad, a touch sensitive screen (which may be integrated with display device 604), a pointer device such as a stylus, and/or a keyboard (e.g., physical keyboard or a virtual keyboard displayed as part of a touch sensitive screen). For example, input device 606 may include a touch screen controller coupled to a touch screen. The touch screen and touch screen controller can, for example, detect contact and movement or a break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

I/O devices 607 may include an audio device. An audio device may include a speaker and/or a microphone to facilitate voice-enabled functions, such as voice recognition, voice replication, digital recording, and/or telephony functions. Other I/O devices 607 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 607 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 610 via a sensor hub (not shown), while other devices such as a keyboard or a thermal sensor may be controlled by an embedded controller (not shown), dependent upon the specific configuration or design of system 600.

The system 600 may include a specialized stand-alone computing device 611 formed from hardware, software, or a combination thereof. For one embodiment, at least one of an AFS logic/module 628C or an optional logic/module 629C (which can use the output of the AFS logic/module 628C for additional image processing and/or generation) may be the specialized stand-alone computing device 611. Additional image processing and/or generation includes, but is not limited to, image editing, classification, pattern recognition, and feature extraction. For one embodiment, at least one of the AFS logic/module 628C or the optional logic/module 629C performs any, all, or some of the processes or methods described above in connection with one or more of FIGS. 1A-5B.

Storage device 608 may include computer-accessible storage medium 609 (also known as a machine-readable storage medium or a computer-readable medium) on which is stored one or more sets of instructions or software—e.g., at least one of an AFS logic/module 628D or an optional logic/module 629D (which can use the output of the AFS logic/module 628D for additional image processing and/or generation). Additional image processing and/or generation includes, but is not limited to, image editing, classification, pattern recognition, and feature extraction.

For one embodiment, the instruction(s) or software stored on the storage medium 609 embody one or more of the methodologies or functions described above in connection with one or more of FIGS. 1A-5B. For one embodiment, the storage device 608 includes at least one of an AFS logic/module 628D or an optional logic/module 629D as executable instructions. When the instructions represented by at least one of the AFS logic/module 628D or the optional logic/module 629D are executed by the processor(s) 601, the instructions cause the processor(s) 601 to perform any, all, or some of the processes or methods described above in connection with one or more of FIGS. 1A-5B. One or more of logic/modules 628A, 628B, 628C, 628D, 629A, 629B, 629C, or 629D may be transmitted or received over a network 612 via network interface device 605.

Computer-readable storage medium 609 can store some or all of the software functionalities of at least one of the AFS logic/module 628D or the optional logic/module 629D described above persistently. While computer-readable storage medium 609 is shown in an exemplary embodiment to be a single medium, the term "computer-readable storage medium" should be taken to include a single medium or multiple media (e.g., a centralized or distributed database, and/or associated caches and servers) that store one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

To provide for persistent storage of information such as data, applications, one or more operating systems and so forth, a mass storage (not shown) may also couple to processor(s) 601. For various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. In addition, a flash device may be coupled to processor(s) 601, e.g., via a serial optional peripheral interface (SPI). This flash device may provide for non-volatile storage of system software, including a basic input/output software (BIOS) and other firmware.

Note that while system 600 is illustrated with various components of a data processing system, it is not intended to represent any particular architecture or manner of interconnecting the components; as such, details are not germane to the embodiments described herein. It will also be appreciated that network computers, handheld computers, mobile phones, servers, and/or other data processing systems, which have fewer components or perhaps more components, may also be used with the embodiments described herein.

Description of at least one of the embodiments set forth herein is made with reference to figures. However, certain embodiments may be practiced without one or more of these specific details, or in combination with other known methods and configurations. In the following description, numerous specific details are set forth, such as specific configurations, dimensions and processes, etc., in order to provide a thorough understanding of the embodiments. In other instances, well-known processes and manufacturing techniques have not been described in particular detail in order to not unnecessarily obscure the embodiments. Reference throughout this specification to "one embodiment," "an embodiment," "another embodiment," "other embodiments," "some embodiments," and their variations means that a particular feature, structure, configuration, or characteristic described in connection with the embodiment is included in at least one embodiment. Thus, the appearances of the phrase "for one embodiment," "for an embodiment," "for another embodiment," "in other embodiments," "in some embodiments," or their variations in various places throughout this specification are not necessarily referring to the same embodiment. Furthermore, the particular features, structures, configurations, or characteristics may be combined in any suitable manner in one or more embodiments.

In the following description and claims, the terms "coupled" and "connected," along with their derivatives, may be used. It should be understood that these terms are not intended as synonyms for each other. "Coupled" is used to indicate that two or more elements or components, which may or may not be in direct physical or electrical contact with each other, co-operate or interact with each other. "Connected" is used to indicate the establishment of communication between two or more elements or components that are coupled with each other.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein can relate to an apparatus for performing a computer program (e.g., the operations described herein, etc.). Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

Although the processes or methods are described above in terms of some sequential operations, it should be appreciated that some of the operations described may be performed in a different order. Moreover, some operations may be performed in parallel rather than sequentially. Embodiments described herein are not described with reference to any particular programming language. It will be appreciated that a variety of programming languages may be used to implement the teachings of embodiments of the invention as described herein. In utilizing the various aspects of the embodiments described herein, it would become apparent to one skilled in the art that combinations, modifications, or variations of the above embodiments are possible for managing components of processing system to increase the power and performance of at least one of those components. Thus, it will be evident that various modifications may be made thereto without departing from the broader spirit and scope of at least one of the inventive concepts set forth in the following claims. The specification and drawings are, accordingly, to be regarded in an illustrative sense rather than a restrictive sense.

In the development of any actual implementation of one or more of the inventive concepts set forth in the embodiments described herein (e.g., as a software and/or hardware development project, etc.), numerous decisions must be made to achieve the developers' specific goals (e.g., compliance with system-related constraints and/or business-related constraints). These goals may vary from one implementation to another, and this variation could affect the actual implementation of one or more of the inventive concepts set forth in the embodiments described herein. Also, development efforts might be complex and time-consuming, but may still be a routine undertaking for a person having ordinary skill in the art in the design and/or implementation of one or more of the inventive concepts set forth in the embodiments described herein.

As used herein, the phrase "at least one of A, B, or C" includes A alone, B alone, C alone, a combination of A and B, a combination of B and C, a combination of A and C, and a combination of A, B, and C. That is, the phrase "at least one of A, B, or C" means A, B, C, or any combination thereof such that one or more of a group of elements consisting of A, B and C, and should not be interpreted as requiring at least one of each of the listed elements A, B and C, regardless of whether A, B and C are related as categories or otherwise. Furthermore, the use of the article "a" or "the" in introducing an element should not be interpreted as being exclusive of a plurality of elements. Also, the recitation of "A, B and/or C" is equal to "at least one of A, B or C."

What is claimed is:

1. A computer-implemented method for an adaptive focus sweep technique, comprising: obtaining a first image representing a scene at a first focus position, the first focus position being associated with a first depth of field and determined based on an autofocus technique; obtaining a second image representing the scene at a second focus position that is associated with a second depth of field, the second focus position being at least two depth of fields away from the first focus position and determined based on the first focus position, wherein there is at least one intermediate depth of field between the first depth of field and the second depth of field, and wherein the at least one intermediate depth of field is configured to protect against inaccuracies in positioning of an imaging system at the first focus position or the second focus position; and detecting a foreground of the scene in the first image based on information acquired from the first and second images.

2. The method of claim 1, wherein the second focus position is two depth of fields away from the first focus position.

3. The method of claim 1, wherein the first image is captured prior to the second image.

4. The method of claim 1, wherein the first image is captured after the second image.

5. The method of claim 1, wherein detecting the foreground of the scene in the first image based on information acquired from the first and second images comprises:
identifying one or more pixels in the first image to be masked by a foreground mask based at least on an initial foreground confidence map comprised of initial confidence values, wherein each initial confidence value is indicative of a level of confidence that a corresponding pixel in the first image is in the foreground; and
generating the foreground mask based at least on the identification.

6. The method of claim 5, wherein the initial foreground confidence map is based on a comparison between sharpness values of corresponding pixels in the first and second images.

7. The method of claim 5, wherein identifying includes:
identifying each pixel in the first image whose initial confidence value is equal to or greater than a threshold confidence value as a pixel to be masked by the initial foreground mask.

8. The method of claim 5, wherein the identified pixels of the first image have a depth within a predetermined range of depths that is based on a depth map associated with at least one of the first image or the second image.

9. The method of claim 5, wherein generating the foreground mask includes:
generating an initial foreground mask based on the identification; and
generating an updated foreground mask based on the initial foreground mask.

10. The method of claim 9, wherein generating the updated foreground mask includes:
extracting a contour band from the initial foreground mask, the contour band encompassing one or more pixels in the first image that are located around one or more edges of the initial foreground mask;
determining a foreground contour confidence value and a background contour confidence value for each pixel in the contour band, wherein the foreground contour confidence value of a pixel is indicative of a degree of certainty that the pixel is part of the foreground, and wherein the background contour confidence value of a pixel is indicative of a degree of certainty that the pixel is part of the background;
identifying one or more pixels in the contour band as foreground contour pixels, wherein each identified foreground contour pixel has a foreground contour confidence value that is larger than the pixel's background contour confidence value by at least a first specified amount;
identifying one or more pixels in the contour band as background contour pixels, wherein each identified background contour pixel has a background contour confidence value that is larger than the pixel's foreground contour confidence value by at least a second specified amount; and
generating the updated foreground mask, wherein the updated foreground mask comprises the initial foreground mask with each of the identified foreground contour pixels from the contour band added and with each of the identified background contour pixels from the contour band removed.

11. The method of claim 10, wherein, for each pixel in the contour band, the foreground contour confidence value and the background contour confidence value are determined based on at least one of a bilateral filter or a variant of a bilateral filter.

12. The method of claim 10, further comprising:
generating one or more additional masks to identify one or more pixels in the first image that are encompassed by the contour band, each of the one or more identified pixels having one or more values below respective one or more threshold levels; and
applying the one or more additional masks to the one or more identified pixels.

13. The method of claim 12, wherein the one or more additional masks includes at least one of a highlight mask, a color mismatch mask, or a focus irregularity mask.

14. The method of claim 12, wherein applying the one or more additional masks to the one or more identified pixels comprises propagating foreground/background classification results from one or more neighboring pixels associated with the updated foreground mask to the one or more identified pixels.

15. The method of claim 1, further comprising:
determining an amount of intermediate depth of fields between the first and second depths of field based on an estimate of depth information for the scene, computation of the estimated depth information and the determination of the amount of intermediate depth of fields being performed prior to capture of one or more of the first and second images.

16. The method of claim 15, further comprising:
refraining from capturing the one or more of the first and second images in response to determining that an estimated distance between the foreground and the background has a predetermined relationship with a threshold distance, wherein the estimate of depth information for the scene includes the estimated distance between the foreground and the background.

17. A non-transitory computer readable medium comprising instructions for an adaptive focus sweep technique, which when executed by one or more processors, cause the one or more processors to: obtain a first image representing a scene at a first focus position, the first focus position being associated with a first depth of field and determined based on an autofocus technique; obtain a second image representing the scene at a second focus position that is associated with a second depth of field, the second focus position being at least two depth of fields away from the first focus position and determined based on the first focus position, wherein there is at least one intermediate depth of field between the first depth of field and the second depth of field, and wherein the at least one intermediate depth of field is configured to protect against inaccuracies in positioning of an imaging system at the first focus position or the second focus position; and detect a foreground of the scene in the first image based on information acquired from the first and second images.

18. The non-transitory computer readable medium of claim 17, wherein the second focus position is two depth of fields away from the first focus position.

19. The non-transitory computer readable medium of claim 17, wherein the first image is captured prior to the second image.

20. The non-transitory computer readable medium of claim 17, wherein the first image is captured after the second image.

21. The non-transitory computer readable medium of claim 17, wherein the instructions that cause the one or more processors to detect the foreground of the scene in the first image based on information acquired from the first and second images comprise instructions that cause the one or more processors to:
identify one or more pixels in the first image to be masked by a foreground mask based at least on an initial foreground confidence map comprised of initial confidence values, wherein each initial confidence value is indicative of a level of confidence that a corresponding pixel in the first image is in the foreground;
generate the foreground mask based at least on the identification.

22. The non-transitory computer readable medium of claim 21, wherein the initial foreground confidence map is based on a comparison between sharpness values of corresponding pixels in the first and second images.

23. The non-transitory computer readable medium of claim 21, wherein the instructions for causing the one or more processors to identify one or more pixels in the first image to be masked by the foreground mask based on the initial foreground confidence map include one or more instructions for causing the one or more processors to:
identify each pixel in the first image whose initial confidence value is equal to or greater than a threshold confidence value as a pixel to be masked by the initial foreground mask.

24. The non-transitory computer readable medium of claim 21, wherein the identified pixels in the first image have a depth within a predetermined range of depths that is based on a depth map associated with at least one of the first image or the second image.

25. The non-transitory computer readable medium of claim 21, wherein the instructions for causing the one or more processors to generate the foreground mask include one or more instructions for causing the one or more processors to:
generate an initial foreground mask based on the identification; and
generate an updated foreground mask based on the initial foreground mask.

26. The non-transitory computer readable medium of claim 25, wherein the instructions for causing the one or more processors to generate the updated foreground mask include one or more instructions for causing the one or more processors to:
extract a contour band from the initial foreground mask, the contour band encompassing one or more pixels in the first image that are located around one or more edges of the initial foreground mask;
determine a foreground contour confidence value and a background contour confidence value for each pixel in the contour band, wherein the foreground contour confidence value of a pixel is indicative of a degree of certainty that the pixel is part of the foreground, and wherein the background contour confidence value of a pixel is indicative of a degree of certainty that the pixel is part of the background;

identify one or more pixels in the contour band as foreground contour pixels, wherein each identified foreground contour pixel has a foreground contour confidence value that is larger than the pixel's background contour confidence value by at least a first specified amount;

identify one or more pixels in the contour band as background contour pixels, wherein each identified background contour pixel has a background contour confidence value that is larger than the pixel's foreground contour confidence value by at least a second specified amount; and generate the updated foreground mask, wherein the updated foreground mask comprises the initial foreground mask with each of the identified foreground contour pixels from the contour band added and with each of the identified background contour pixels from the contour band removed.

27. The non-transitory computer readable medium of claim 26, wherein the instructions for causing the one or more processors to determine the foreground contour confidence value and the background contour confidence value for each pixel in the contour band include one or more instructions for causing the one or more processors to:

determine the foreground contour confidence value and the background contour confidence value for each pixel in the contour band based on at least one of a bilateral filter or a variant of a bilateral filter.

28. The non-transitory computer readable medium of claim 26, further comprising instructions for causing the one or more processors to:

generate one or more additional masks to identify one or more pixels in the first image that are encompassed by the contour band, each of the one or more identified pixels having one or more values below respective one or more threshold levels; and apply the one or more additional masks to the one or more identified pixels.

29. The non-transitory computer readable medium of claim 28, wherein the one or more additional masks includes at least one of a highlight mask, a color mismatch mask, or a focus irregularity mask.

30. The non-transitory computer readable medium of claim 28, wherein the instructions for causing the one or more processors to apply the one or more additional masks to the one or more identified pixels comprise instructions for causing the one or more processors to propagate foreground/background classification results from one or more neighboring pixels associated with the updated foreground mask to the one or more identified pixels.

31. The non-transitory computer readable medium of claim 17, further comprising instructions for causing the one or more processors to:

determine an amount of intermediate depth of fields between the first and second depths of field based on an estimate of depth information for the scene, computation of the estimated depth information and the determination of the amount of intermediate depth of fields being performed prior to capture of one or more of the first and second images.

32. The non-transitory computer readable medium of claim 31, further comprising instructions for causing the one or more processors to:

refrain from capturing the one or more of the first and second images in response to the one or more processors determining that an estimated distance between the foreground and the background has a predetermined relationship with a threshold distance, wherein the estimate of depth information for the scene includes the estimated distance between the foreground and the background.

33. A computer-implemented method for an adaptive focus sweep technique, comprising: obtaining a first image representing a scene using a first focus position that is determined based on an autofocus technique, wherein the first focus position is associated with a first object position that has a first depth of focus; obtaining a second image representing the scene using a second focus position that is determined based on the first focus position, wherein the second focus position is associated with a second object position that has a second depth of focus, wherein the first depth of focus and the second depth of focus are separated by one or more third depths of focus that correspond to one or more third object positions, and wherein each of the one or more third object positions is between the first and second object positions, and wherein the one or more third depths of focus are configured to protect against inaccuracies in positioning of an imaging system at the first focus position or the second focus position; and detecting a foreground of the scene in the first image based on the first and second images.

34. The method of claim 33, wherein the first focus position is determined by using the autofocus technique for a foreground object in the scene.

35. The method of claim 34, wherein, in the first image, the foreground object is more in focus than a background object in the scene, and wherein, in the second image, the foreground object is more out of focus than the background object.

36. The method of claim 33, wherein at least one of the one or more third depths of focus borders at least one of the first depth of focus or the second depth of focus.

37. The method of claim 33, wherein at least one of the one or more third depths of focus does not border at least one of the first depth of focus or the second depth of focus.

38. The method of claim 33, further comprising determining at least one of the one or more third object positions based on the first depth of focus and the second depth of focus.

39. A non-transitory computer readable medium comprising instructions for an adaptive focus sweep technique, which when executed by one or more processors, cause the one or more processors to: obtain a first image representing a scene using a first focus position that is determined based on an autofocus technique, wherein the first focus position is associated with a first object position that has a first depth of focus; obtain a second image representing the scene using a second focus position that is determined based on the first focus position, wherein the second focus position is associated with a second object position that has a second depth of focus, wherein the first depth of focus and the second depth of focus are separated by one or more third depths of focus that correspond to one or more third object positions, and wherein each of the one or more third object positions is between the first and second object positions, and wherein the one or more third depths of focus are configured to protect against inaccuracies in positioning of an imaging system at the first focus position or the second focus position; and detect a foreground of the scene in the first image based on the first and second images.

40. The non-transitory computer readable medium of claim 39, wherein the first focus position is determined by using the autofocus technique for a foreground object in the scene.

41. The non-transitory computer readable medium of claim 40 wherein, in the first image, the foreground object is more in focus than a background object in the scene, and wherein, in the second image, the foreground object is more out of focus than the background object.

42. The non-transitory computer readable medium of claim 39, wherein at least one of the one or more third depths of focus borders at least one of the first depth of focus or the second depth of focus.

43. The non-transitory computer readable medium of claim 39, wherein at least one of the one or more third depths of focus does not border at least one of the first depth of focus or the second depth of focus.

44. The non-transitory computer readable medium of claim 43, further comprising instructions for causing the one or more processors to determine at least one of the one or more third object positions based on the first depth of focus and the second depth of focus.

* * * * *